US 012470857B2

(12) United States Patent  
Mueller et al.

(10) Patent No.: US 12,470,857 B2  
(45) Date of Patent: Nov. 11, 2025

(54) MICROPHONE SWITCH FOR PLAYBACK DEVICE

(71) Applicant: Sonos, Inc., Santa Barbara, CA (US)

(72) Inventors: Thomas Mueller, Boston, MA (US); Riley Stenstrom, Los Angeles, CA (US); Charles LaColla, Woodland Hills, CA (US); Andres Huertas, Melville, NY (US)

(73) Assignee: Sonos, Inc., Goleta, CA (US)

(*) Notice: Subject to any disclaimer, the term of this patent is extended or adjusted under 35 U.S.C. 154(b) by 143 days.

(21) Appl. No.: 18/469,748

(22) Filed: Sep. 19, 2023

(65) Prior Publication Data

US 2024/0107214 A1  Mar. 28, 2024

Related U.S. Application Data

(60) Provisional application No. 63/377,103, filed on Sep. 26, 2022.

(51) Int. Cl.  
*H04R 1/08* (2006.01)

(52) U.S. Cl.  
CPC ..................... *H04R 1/08* (2013.01)

(58) Field of Classification Search  
CPC ... H04R 1/08; H04R 3/00; H04R 1/04; H04R 2227/005; G10L 2015/223  
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Tuan D Nguyen  
(74) *Attorney, Agent, or Firm* — Finch & Maloney PLLC

(57) ABSTRACT

Switch assemblies and network devices incorporating same. An example playback device includes a housing, one or more microphones, and a switch assembly configured to enable and disable the microphone(s). The switch assembly may include a slider cage coupled to the housing, an electrical actuator, and a sliding switch sub-assembly configured to slide laterally between first and second positions along a path constrained by the slider cage, the sliding switch sub-assembly including an actuator portion that extends through an opening in the housing to an exterior of the playback device and a translation component that converts lateral motion of the sliding switch sub-assembly between the first and second positions into vertical motion that activates the electrical actuator to enable the microphone(s) when the sliding switch sub-assembly is in the first position and deactivates the electrical actuator to disable the microphone(s) when the sliding switch sub-assembly is in the second position.

20 Claims, 16 Drawing Sheets

(56) References Cited

U.S. PATENT DOCUMENTS

| | | |
|---|---|---|
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2022/0400344 A1* | 12/2022 | Woo .................. H04S 3/008 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

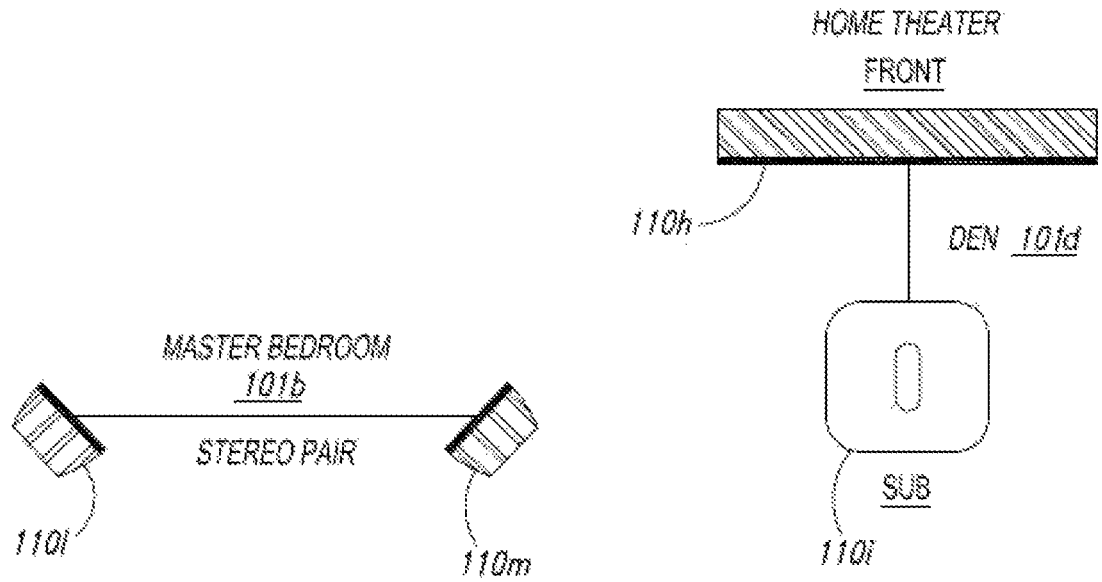
Fig. 2A
Fig. 2B
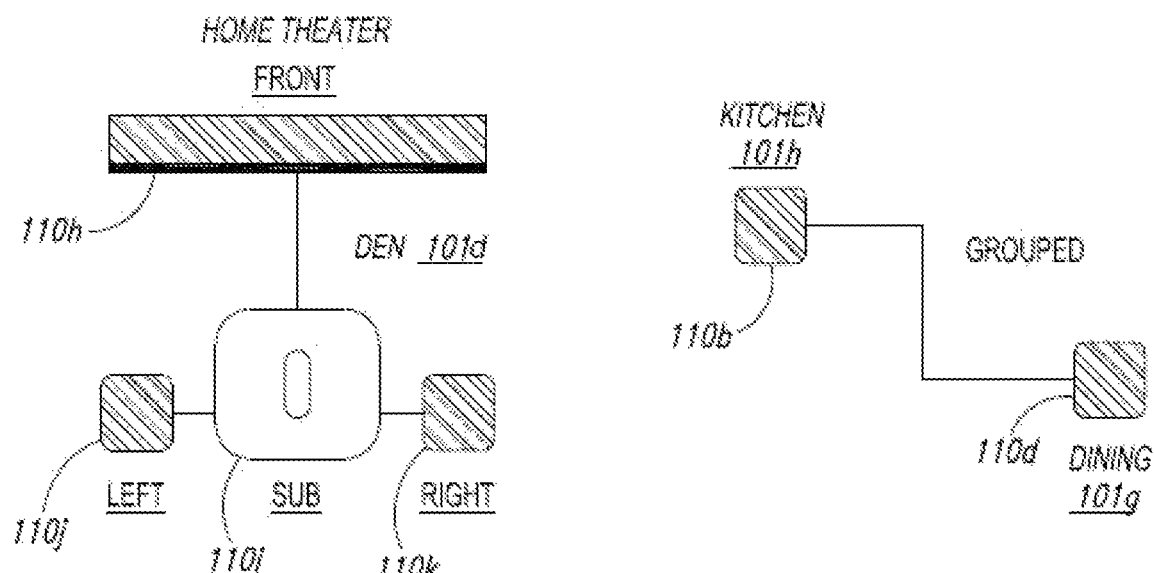
Fig. 2C
Fig. 2D

MICROPHONE SWITCH FOR PLAYBACK DEVICE

CROSS-REFERENCE TO RELATED APPLICATIONS

This application claims priority under 35 U.S.C. § 119(e) to U.S. Provisional Application No. 63/377,103 filed on Sep. 26, 2022 and titled "MICROPHONE SWITCH FOR PLAYBACK DEVICE," which is hereby incorporated herein by reference in its entirety for all purposes.

TECHNICAL FIELD

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, titled "Method for Synchronizing Audio Playback between Multiple Networked Devices," and began offering its first media playback systems for sale in 2005. The SONOS Wireless Home Sound System enables people to experience music from many sources via one or more networked playback devices. Through a software control application installed on a controller (e.g., a smartphone, tablet, computer, voice input device, etc.) one can play what she wants in any room having a networked playback device. Media content (e.g., songs, podcasts, video sound, etc.) can be streamed to playback devices, such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

FIGS. 2A-2D are diagrams showing examples of playback device configurations in accordance with aspects of the disclosure;

DETAILED DESCRIPTION

I. Overview

Figure 1A:
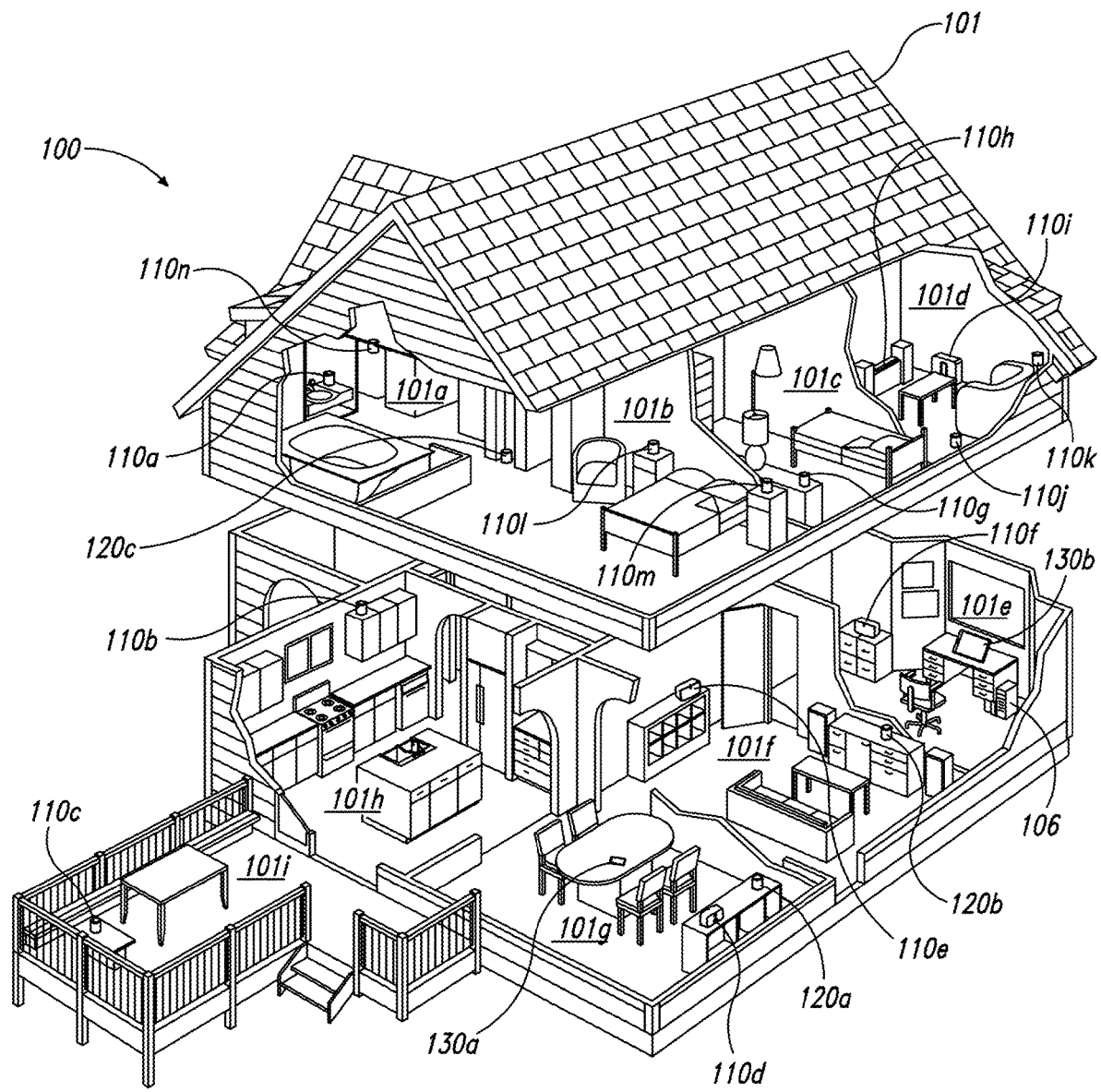
FIG. 1A is a partial cutaway view of an environment having a media playback system configured in accordance with aspects of the disclosed technology.

Aspects and embodiments are directed to a mechanical switch for controlling a parameter of a network device, such as controlling a state of one or more microphones included in the network device, and a network device housing incorporating the switch.

Many consumer electronics devices, such as smart home devices, appliances, and other network devices, are equipped with one or more microphones that can be used to interact with a voice assistant service to which the device might be linked. For these types of "voice-enabled" devices, the microphone(s) may be used to detect and process sound in the environment to determine if the sound includes speech containing voice input intended for a particular voice assistant service. For instance, the device may be configured to identify a wake word in the detected sound that corresponds to the voice assistant service.

In addition to providing a gateway to the voice assistant service, in certain network devices the microphone(s) may be used for other purposes as well. For example, for network devices that are equipped with more advanced media playback system functions, such as those developed and sold by Sonos, Inc. ("Sonos"), the device microphone(s) may be utilized as a sensor for detecting sound within the environment to facilitate additional features. These types of additional microphone-based features may take various forms, including audio calibration of a playback device (e.g., self-calibration) to improve the playback device's spectral response, and audio-based proximity detection (e.g., via ultrasonic audio tones) between playback devices and control devices of the media playback system, which in turn may enable a host of additional features. For example, playback devices in a media playback system may use audio-based proximity detection to facilitate transitioning a playback session from one device to another (e.g., from a portable device to a nearby stationary device or vice versa), forming synchrony groups with nearby devices, and/or setting up new playback devices, among other possibilities.

In many cases, voice-enabled devices have a switch or similar control that a user may toggle to disable or mute the device's microphone(s) for the purpose of disabling the device's sound detection, in particular speech detection, capabilities. For example, a user might, based on their privacy or security preferences, temporarily disable the microphone(s) on their devices to ensure that no voice data is recorded.

In some instances, it may be preferable to have the ability to conveniently (e.g., via an on-device user interface) enable or disable voice assistant capabilities separately from the operation of the playback device's microphone(s). This may allow a user to quickly and easily disable voice assistant services when desired, while nonetheless continuing to benefit from other capabilities of the playback device that depend on its microphone(s) to function. Commonly-owned U.S. Provisional Patent Application No. 63/250,900 titled "ENABLING AND DISABLING MICROPHONES AND VOICE ASSISTANTS" and filed on Sep. 30, 2021, which is hereby incorporated herein by reference in its entirety for all purposes and attached hereto as Appendix A, describes examples of playback devices that include separate user interface controls for enabling and disabling the playback device's voice assistant features and the playback device's microphone(s). For example, a playback device may include a hardware control interface that incorporates a capacitive touch control or similar button that is selectable by a user to enable or disable the playback device's voice assistant features. In other examples, the voice assistant features may be controlled via software (e.g., through an app on a controller device 130). When the voice assistant features are disabled, the playback device may still be capable of detecting sound in the environment (e.g., to facilitate other playback device features) via its one or more microphones, which may remain on. However, the playback device might not perform any audio processing to determine whether the detected sound includes speech containing voice input intended for the voice assistant service. Separately, the playback device may include a switch (e.g., a mechanical switch) that a user may toggle between on and off positions to control the operability of the playback device's microphone(s).

There is a growing demand for portable playback devices that may be used both indoors and outdoors. For example, Sonos offers certain playback devices that are suitable for use outdoors and, as such, have a certain level of water resistance. Incorporating a mechanical switch, in particular, a sliding switch, into a device housing while maintaining desired levels of waterproofing or water resistance and preventing water ingress through the switch opening is non-trivial.

In certain examples, to avoid the difficulties associated with using a mechanical switch, a different type of control for enabling and disabling the device microphone(s) could be used. For example, as discussed above, a capacitive touch control or similar button may be used to enable and disable the microphone(s) as well as voice assistant features. However, a capacitive touch control or similar button may not provide the same level of certainty that the desired action has been accomplished as a mechanical switch. For example, a mechanical sliding switch may provide both a haptic response (i.e., the user can feel the switch has moved from one position to another) and an immediate visual confirmation (i.e., the user can see which position the switch is in). In contrast, although a push button or capacitive touch control may offer an immediate haptic confirmation of the action, after it has been pressed, there may be little or no physical confirmation visible to the user of whether the controlled component (microphone or other) is ON or OFF. In some examples, as discussed in U.S. Provisional Patent Application No. 63/250,900 referenced above, a LED or other visual indicator may be used in conjunction with a button to provide a visual indication to the user as to the status of the controlled component. However, for certain users (e.g., those with strong privacy concerns regarding the status of the device's microphones), the physical certainty provided by a mechanical switch still may be desirable.

Accordingly, aspects and embodiments provide a network device housing that incorporates a mechanical switch that can be used to control one or more components of the network device (such as one or more microphones), wherein the housing and the switch are configured to maintain a desired water resistance rating of the network device.

In some embodiments, for example, a playback device is provided including a housing, one or more microphones housed within the housing, and a switch assembly configured to enable and disable the one or more microphones. The switch assembly may comprise a slider cage positioned inside the housing and coupled to the housing, an electrical actuator, and a sliding switch sub-assembly configured to slide laterally between a first position and a second position along a path constrained by the slider cage, the sliding switch sub-assembly including an actuator portion that extends through an opening in the housing to an exterior of the playback device and a translation component that converts lateral motion of the sliding switch sub-assembly between the first and second positions into vertical motion that activates the electrical actuator to enable the one or more microphones when the sliding switch sub-assembly is in the first position and deactivates the electrical actuator to disable the one or more microphones when the sliding switch sub-assembly is in the second position.

While some examples described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
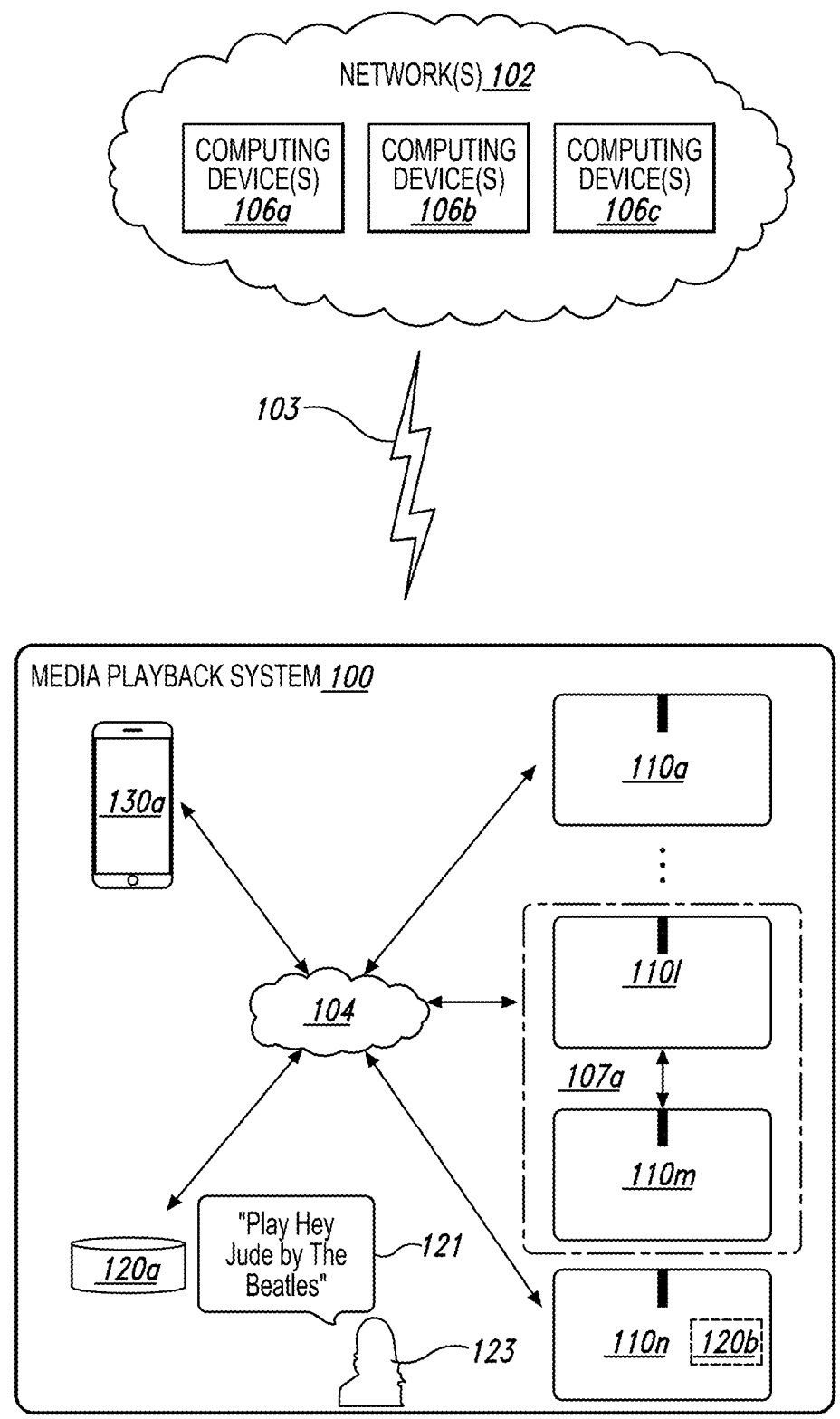
FIG. 1B is a schematic diagram of the media playback system of FIG. 1A and one or more networks.

FIGS. 1A and 1B illustrate an example configuration of a media playback system 100 (or "MPS 100") distributed in an environment 101. In the example shown in FIG. 1A, the environment 101 is a house having several rooms, spaces, and/or playback zones, including a master bathroom 101a, a master bedroom 101b, a second bedroom 101c, a family room or den 101d, an office 101e, a living room 101f, a dining room 101g, a kitchen 101h, and an outdoor patio 101i. While certain aspects and examples are described below in the context of a home environment, the technologies described herein may be implemented in other types of environments. In some examples, for instance, the MPS 100 can be implemented in one or more commercial settings (e.g., a restaurant, mall, airport, hotel, a retail or other store), one or more vehicles (e.g., a sports utility vehicle, bus, car, a ship, a boat, an airplane, etc.), multiple environments (e.g., a combination of home and vehicle environments), and/or another suitable environment where multi-zone audio may be desirable.

The MPS 100 comprises one or more network devices, which may include one or more playback devices 110 (identified individually as playback devices 110a-n), network microphone devices 120 (identified individually as "NMDs" 120a-120c), and control devices (or controllers) 130 (identified individually as control devices 130a and 130b). The network devices may be distributed in the environment 101 as shown, for example, in FIG. 1A.

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers, as discussed further below. In other embodiments, however, a playback device includes one of (or neither of) the speaker and the amplifier. For instance, a playback device can comprise one or more amplifiers configured to drive one or more speakers external to the playback device via a corresponding wire or cable.

As used herein the term "network microphone device" ("NMD") can generally refer to a network device that is configured for audio detection. As such, the NMD 120 may include a microphone that is configured to detect sounds in the NMD's environment. In some embodiments, an NMD is a stand-alone device configured primarily for audio detection. In other embodiments, an NMD is incorporated into a playback device (or vice versa). A playback device 110 that includes components and functionality of an NMD 120 may be referred to as being "NMD-equipped."

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices, etc.) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation, etc.). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-3.

In examples described below, one or more of the various playback devices 110 may be configured as a portable playback device, while others may be configured as stationary playback devices. For example, certain playback devices 110, such as headphones or the playback device 110c on the patio 101i, for example, may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like (such as the playback device 110e, for example) may be referred to herein as "stationary playback devices," although such devices may in fact be moved around a home or other environment. In practice, a person might often take a portable playback device to and from a home or other environment in which one or more stationary playback devices remain.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the second bedroom 101c, the office 101e, the living room 101f, the dining room 101g, the kitchen 101h, and the outdoor patio 101i each include one playback device 110, and the master bathroom 101a, the master bedroom 101b, and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-k can be configured, for instance, to play back audio content in synchrony as individual ones of playback devices 110, as one or more bonded playback devices, and/or as one or more consolidated playback devices.

In some aspects, one or more of the playback zones in the environment 101 may each be playing different audio content. For instance, a user on the patio 101i may be listening to hip hop music being played by the playback device 110c while another user in the kitchen 101h may be listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

The various playback and network microphone devices 110 and 120 of the MPS 100 may each be associated with a unique name, which may be assigned to the respective devices by a user, such as during setup of one or more of these devices. For example, some playback devices may be assigned names according to a zone or room in which the playback devices are located. Further, certain playback devices may have functionally descriptive names. For example, the playback devices 110j and 110k may be assigned the names "Left" and "Right," respectively, because these two devices are configured to provide specific audio channels during media playback in the zone of the Den 101d (FIG. 1A). Other naming conventions are possible.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content, etc.) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a BLUETOOTH network, a Z-WAVE network, a ZIGBEE network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household or commercial facility communication network (e.g., a household or commercial facility WIFI network). In some embodiments, the links 103 and the network 104 comprise one or more of the same networks. In some aspects, for example, the links 103 and the network 104 comprise a telecommunication network (e.g., an LTE network, a 5G network, etc.). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud servers that host cloud services.

The MPS 100 may retrieve and play audio content from various audio sources. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices.

Example audio content sources may include a memory of one or more playback devices 110 in a media playback system such as the MPS 100 of FIG. 1A, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length, etc.) and other associated information (e.g., URIs, URLs, etc.) for each identifiable media item found. In some embodiments, for example, the media content database is stored on one or more of the playback devices 110, network microphone devices 120, and/or control devices 130.

As discussed above, the media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. In some implementations, the various playback devices 110, NMDs 120, and/or controller devices 130 may be communicatively coupled to at least one remote computing device associated with a voice activated service ("VAS"). The NMD 120a, for example, is configured to receive voice input 121 from a user 123. In some embodiments, the NMD 120a transmits data associated with the received voice input 121 to a VAS configured to (i) process the received voice input data and (ii) facilitate one or more operations on behalf of the media playback system 100. In some aspects, for example, one or more of the computing devices 106 may comprise one or more modules and/or servers of a VAS (e.g., a VAS operated by one or more of SONOS, AMAZON, GOOGLE, APPLE, MICROSOFT, etc.). The computing device 106 can receive the voice input data from the NMD 120a via the network 104 and the links 103.

As discussed above, an NMD 120 may detect and process sound from its environment, such as sound that includes background noise mixed with speech spoken by a person in the NMD's vicinity. For example, as sounds are detected by the NMD 120 in the environment 101, the NMD 120 may process the detected sound to determine if the sound includes speech that contains voice input intended for the NMD 120 and ultimately a particular VAS. For example, the NMD 120 may identify whether speech includes a wake word associated with a particular VAS.

Still referring to FIG. 1B, in certain examples, in response to receiving the voice input data from the NMD 120a, for example, the computing device 106 processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106 may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

a. Example Playback & Network Microphone Devices

Figure 1C:
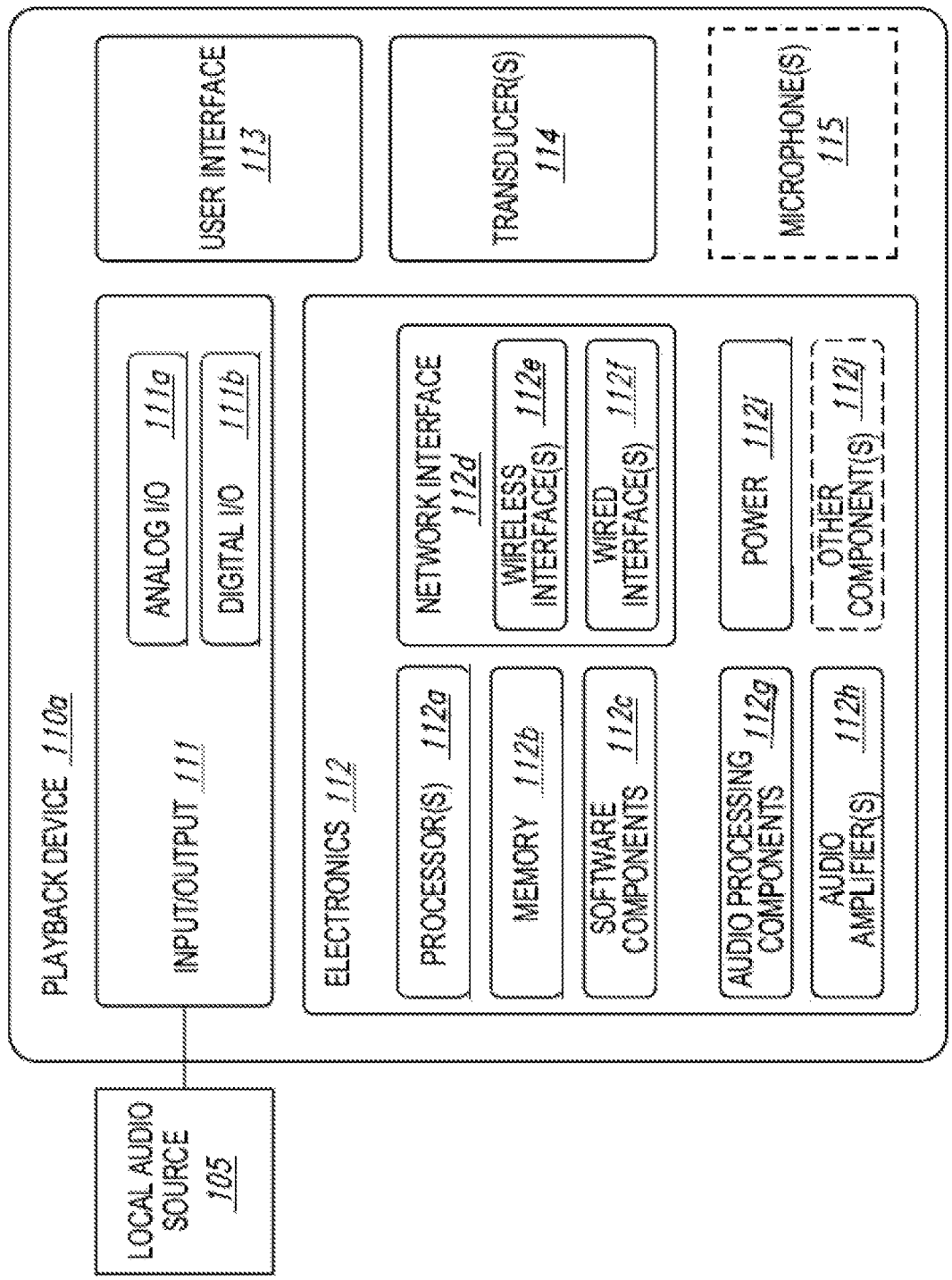
FIG. 1C is a functional block diagram of an example of a playback device.

FIG. 1C is a functional block diagram illustrating certain aspects of one of the playback devices 110a of the MPS 100 of FIGS. 1A and 1B. As shown, the playback device 110a comprises various components, each of which is discussed in further detail below. In the illustrated example of FIG. 1C, the playback device 110a may be referred to as an "NMD-equipped" playback device because it includes components that support the functionality of an NMD, such as one of the NMDs 130 shown in FIG. 1A.

The playback device 110a comprises an input/output 111 that may include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication link. In certain embodiments, the analog I/O 111a and the digital I/O 111b comprise interfaces (e.g., ports, plugs, jacks, etc.) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer, etc.) or another suitable audio component (e.g., a television, a desktop computer, an amplifier, a phonograph (such as an LP turntable), a Blu-ray player, a memory storing digital media files, etc.). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array, etc.) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some implementations, the power components 112i may include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source. In some embodiments, the electronics 112 optionally include one or more other components 112j (e.g., one or more sensors, video displays, touchscreens, battery charging bases, etc.).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone, etc.).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which is incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue with which the playback device 110a (and/or another of the one or more playback devices) can be associated. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds, etc.) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receive and process the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WIFI, BLUETOOTH, LTE, etc.). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 exclude the network interface 112d altogether and transmit and receive media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omit the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers 112h include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 include a single one of the amplifiers 112h configured to output amplified audio signals to a plurality of the transducers 114. In some other embodiments, the electronics 112 omit the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, Sonos, Inc. presently offers (or has offered) for sale certain playback devices including, for example, a "SONOS ONE," "PLAY:1," "PLAY:3," "PLAY:5," "PLAYBAR," "CONNECT:AMP," "PLAYBASE," "BEAM," "CONNECT," "AMP," "PORT," and "SUB." Any other past, present, and/or future playback devices may additionally or alternatively be used to implement the playback devices of examples disclosed herein. Additionally, it should be understood that a playback device is not limited to the examples illustrated in FIG. 1C or 2B or to the Sonos product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, an LP turntable, a lighting fixture, or some other device for indoor or outdoor use.

Figure 1E:
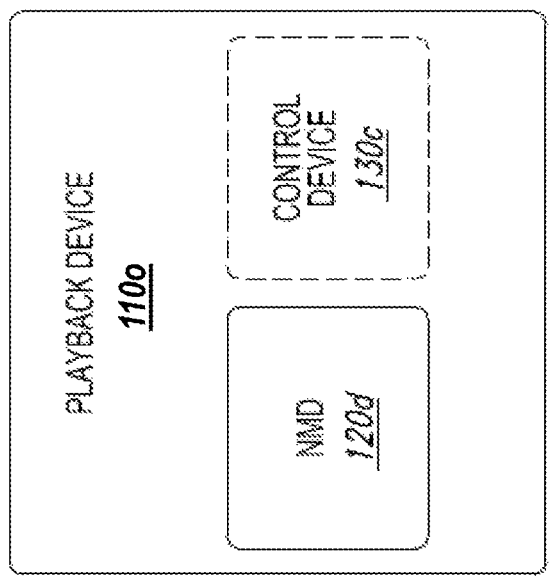
FIG. 1E is a conceptual block diagram of one example of a playback device in accordance with aspects of the disclosure.
Figure 1D:
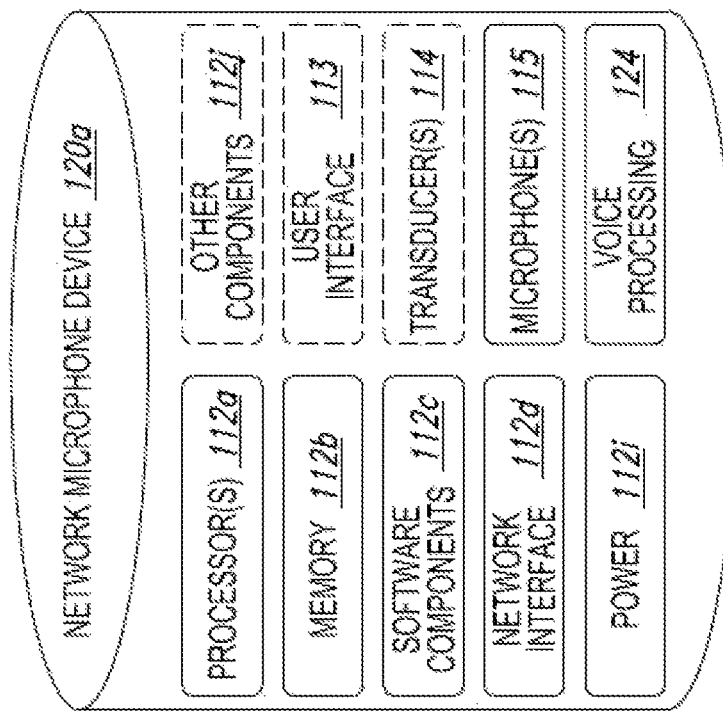
FIG. 1D is a functional block diagram of one example of a network microphone device in accordance with aspects of the disclosure.

FIG. 1D is a functional block diagram of an example of an NMD 120a. The NMD 120a includes one or more voice processing components 124 and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers, etc.).

In some embodiments, an NMD can be integrated into a playback device. FIG. 1E is a block diagram of a playback device 110o comprising an NMD 120d. The playback device 110o can comprise many or all of the components of the playback device 110a of FIG. 1C and further include the microphones 115 and voice processing components 124. The playback device 110o optionally includes an integrated control device 130c. The control device 130c can comprise, for example, a user interface (e.g., the user interface 133 of FIG. 1B) configured to receive user input (e.g., touch input, voice input, etc.) without a separate control device. In other embodiments, however, the playback device 110o receives commands from another control device (e.g., the control device 130a of FIG. 1B).

Referring again to FIG. 1D, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input.

After detecting the activation word, voice processing 124 monitors the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a Sonos playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

c. Example Controller Devices

Figure 1F:
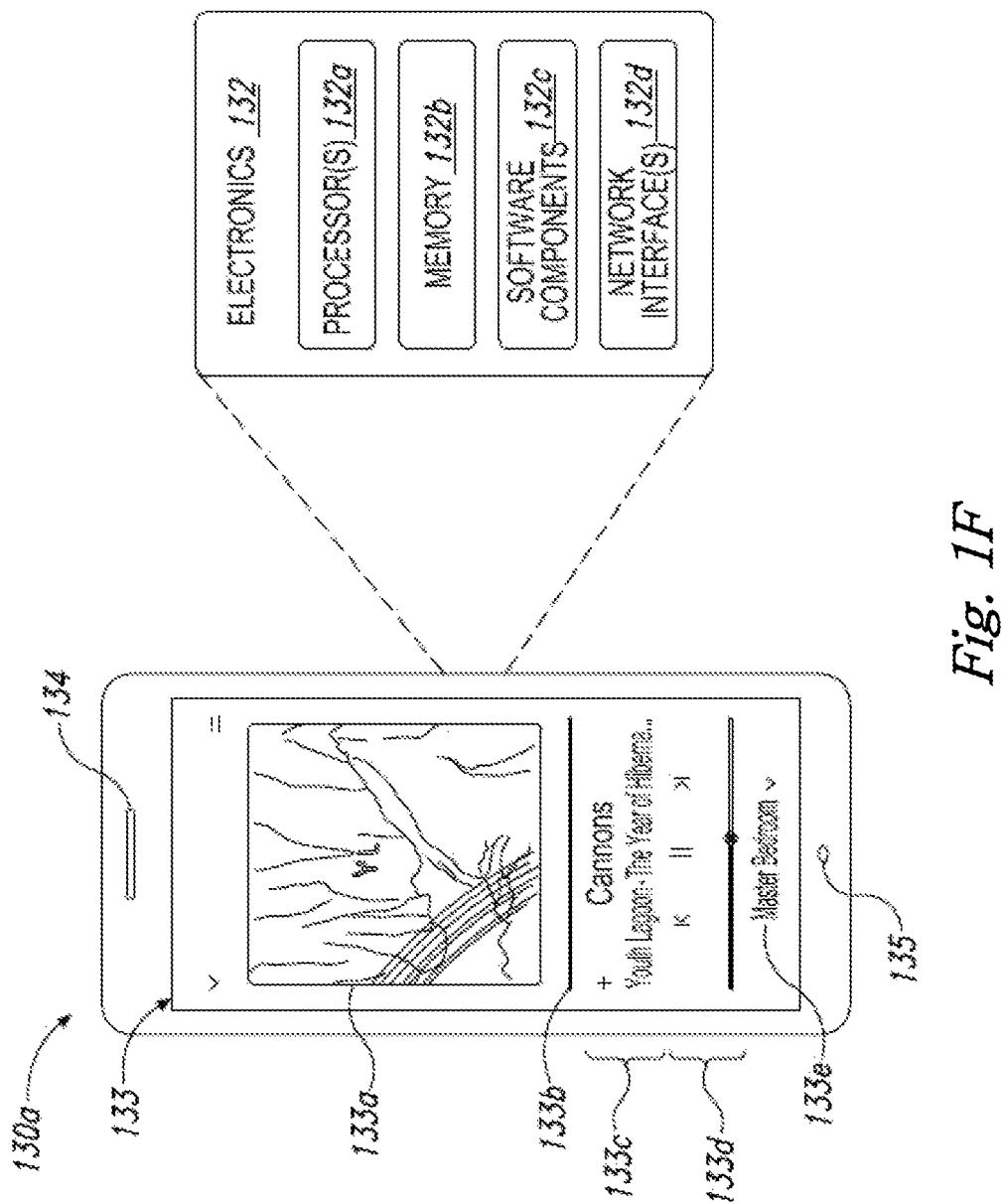
FIG. 1F is a functional block diagram of an example controller device in accordance with aspects of the disclosure.

FIG. 1F is a partial schematic diagram of an example of a control device 130a. As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone, etc.) on which media playback system controller application software is installed. In some embodiments, the control device 130a comprises, for example, a tablet (e.g., an iPad™), a computer (e.g., a laptop computer, a desktop computer, etc.), and/or another suitable device (e.g., a television, an automobile audio head unit, an IoT device, etc.). In certain embodiments, the control device 130a comprises a dedicated controller for the media playback system 100. In other embodiments, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 132b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE, etc.). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 100. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year, etc.) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound, etc.) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

b. Example Playback Device Configurations

FIGS. 2A-2D show example configurations of playback devices. As discussed above, in certain instances, one or more playback devices 110 may belong to a zone. Further, playback devices 110 may be grouped together in various configurations. In the illustrated example of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources.

In some example instances, multiple playback devices may be "bonded" to form a "bonded pair," which together form a single zone. Bonded playback devices may have different playback responsibilities, such as playback responsibilities for certain audio channels. For example, referring to FIGS. 1B and 2A, the group 107a comprises a bonded zone in which the playback devices 110l and 110m comprise left audio and right audio channels, respectively, of multichannel audio content, thereby producing or enhancing a stereo effect of the audio content. In some implementations, such stereo bonding may be referred to as "pairing."

Additionally, playback devices that are configured to be bonded may have additional and/or different respective speaker drivers. As shown in FIG. 2B, for example, the playback device 110h named "Front" may be bonded with the playback device 110i named "SUB" for a home theatre configuration. The Front device 110h may render a range of mid to high frequencies, and the SUB device 110i may render low frequencies as, for example, a subwoofer. When unbonded, the Front device 110h may be configured to render a full range of frequencies. As another example, FIG. 2C shows the Front and SUB devices 110h and 110i further bonded with Right and Left playback devices 110k and 110j, respectively. In some implementations, the Right and Left devices 110k and 110j may form surround or "satellite" channels of a home theater system.

In some implementations, playback devices may also be "merged." In contrast to certain bonded playback devices, playback devices that are merged may not have assigned playback responsibilities, but may each render the full range of audio content that each respective playback device is capable of. That is, the merged playback devices 102d and 102m may, aside from playing audio content in synchrony, each play audio content as they would if they were not merged. Nevertheless, merged devices may be represented as a single UI entity (i.e., a zone, as discussed above). For instance, FIG. 2D shows the playback devices 110e ("Bookcase") and 110d ("Dining Room") merged.

In certain embodiments, the group 107a (FIG. 1B) includes additional playback devices 110. In other embodiments, however, the media playback system 100 omits the group 107a and/or other grouped arrangements of the playback devices 110. Thus, any of the playback devices 110 may be configured, for example, to play back audio content in synchrony as individual ones of playback devices 110, as a bonded playback zone, as a consolidated playback device, and/or any combination thereof. Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 130, playback devices may be dynamically grouped and ungrouped to form new or different groups that synchronously play back audio content.

III. Examples of Microphone Switch for Playback Devices

As discussed above, examples of the playback devices 110 include a user interface 113 that may facilitate user interactions independent of or in conjunction with user interactions facilitated by one or more of the controller devices 130. In various examples, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and speakers to provide visual and/or audio feedback to a user.

Figure 3:
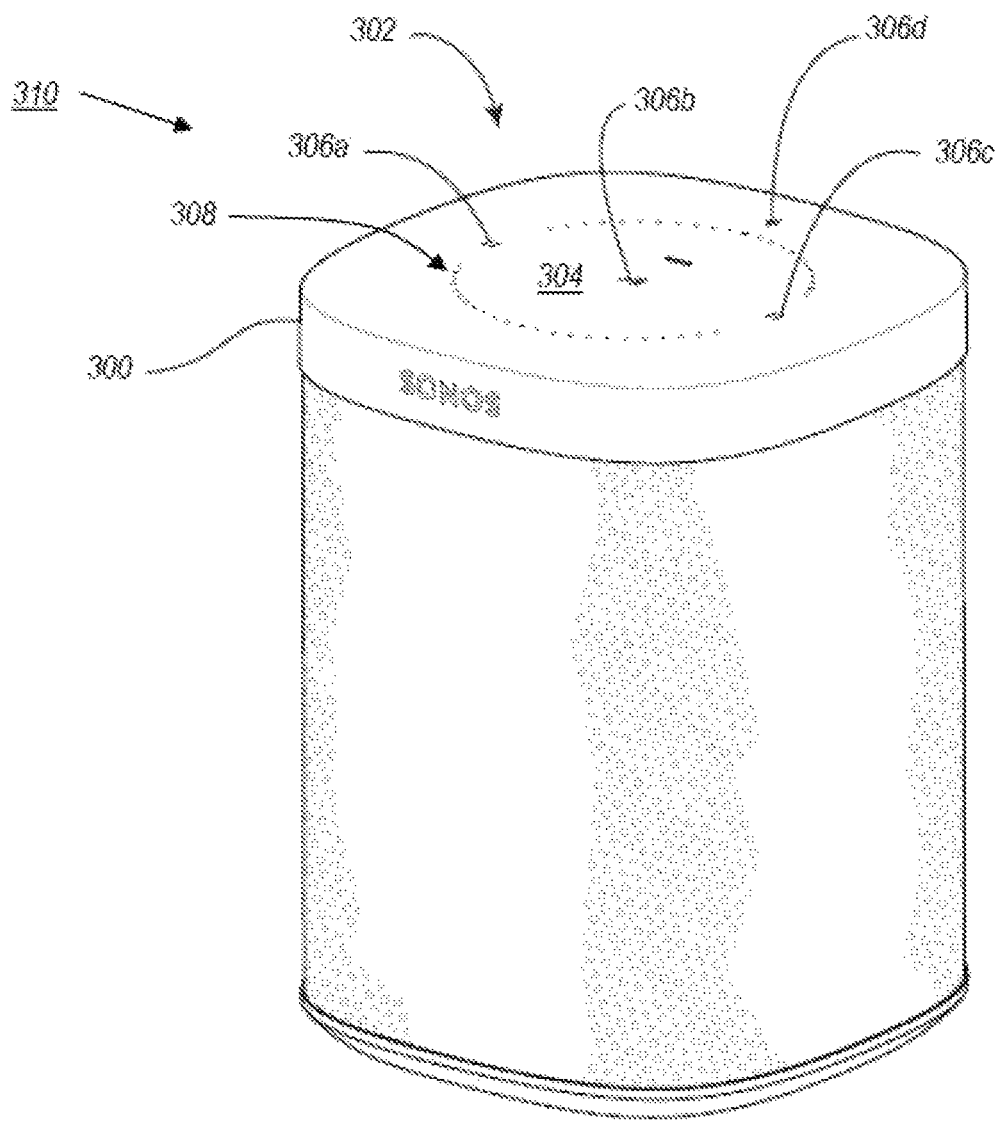
FIG. 3 is an isometric diagram of an example of a housing of the playback device of FIG. 2A.

As an illustrative example, FIG. 3 shows an example of a housing 300 of a playback device 110 that includes a user interface in the form of a control area 302 at a top portion 304 of the housing 300. The control area 302 includes buttons 306a-c for controlling audio playback, volume level, and other functions. The control area 302 may also include one or more additional button(s) 306d for performing other functions, such as enabling and disabling voice assistant features or activating a wireless connection (e.g., BLUETOOTH), among others. In certain examples, the playback device 110 may further include user interface features on other portions of the housing 300 (e.g., a bottom portion or side portions), as discussed further below. In the illustrated example, the control area 302 is at least partially surrounded by apertures 308 formed in the top portion 304 of the housing 300 through which the one or more microphones 115 (not visible in FIG. 3) receive sound from the environment of the playback device 110. The microphone(s) 115 may be arranged in various positions along and/or within the top portion 304 or other areas of the housing 300 so as to detect sound from one or more directions relative to the playback device 110.

One of the aspects that may be controlled via an on-device user interface is the enabling and disabling of the device's microphone(s). As discussed above, aspects and embodiments provide a mechanical switch that can be used to physically enable and disable the microphone(s) (as opposed to the microphone functionality being enabled or disabled in software), providing a level of confidence and certainty as to the status of the microphone(s) that may not be as apparent or available with other control mechanisms, such as capacitive touch controls or software-based controls, for example. Further, embodiments of the microphone switch disclosed herein are configured so as to be compatible with maintaining a waterproof seal between exterior components of the device housing (such as a switch actuator that can be accessed by a user) and the interior of the device housing, where electronics and other moisture sensitive components may be located. As will be appreciated by those skilled in the art, given the benefit of this disclosure, maintaining a waterproof seal for a sliding switch is a mechanically complex problem. A simple gasket, as may be used with laterally static components (i.e., those that do not move side-to-side relative to one another) such as certain push buttons, for example, cannot be used to create a seal for a sliding switch because of the need for components of the switch to move relative to one another so as to actuate the switch between different positions. Accordingly, aspects and embodiments provide a novel mechanical arrangement to address this problem and allow network devices incorporating embodiments of the microphone switch to meet certain ingress protection (IP) ratings, such as the IP-54 rating, for example.

Figure 4:
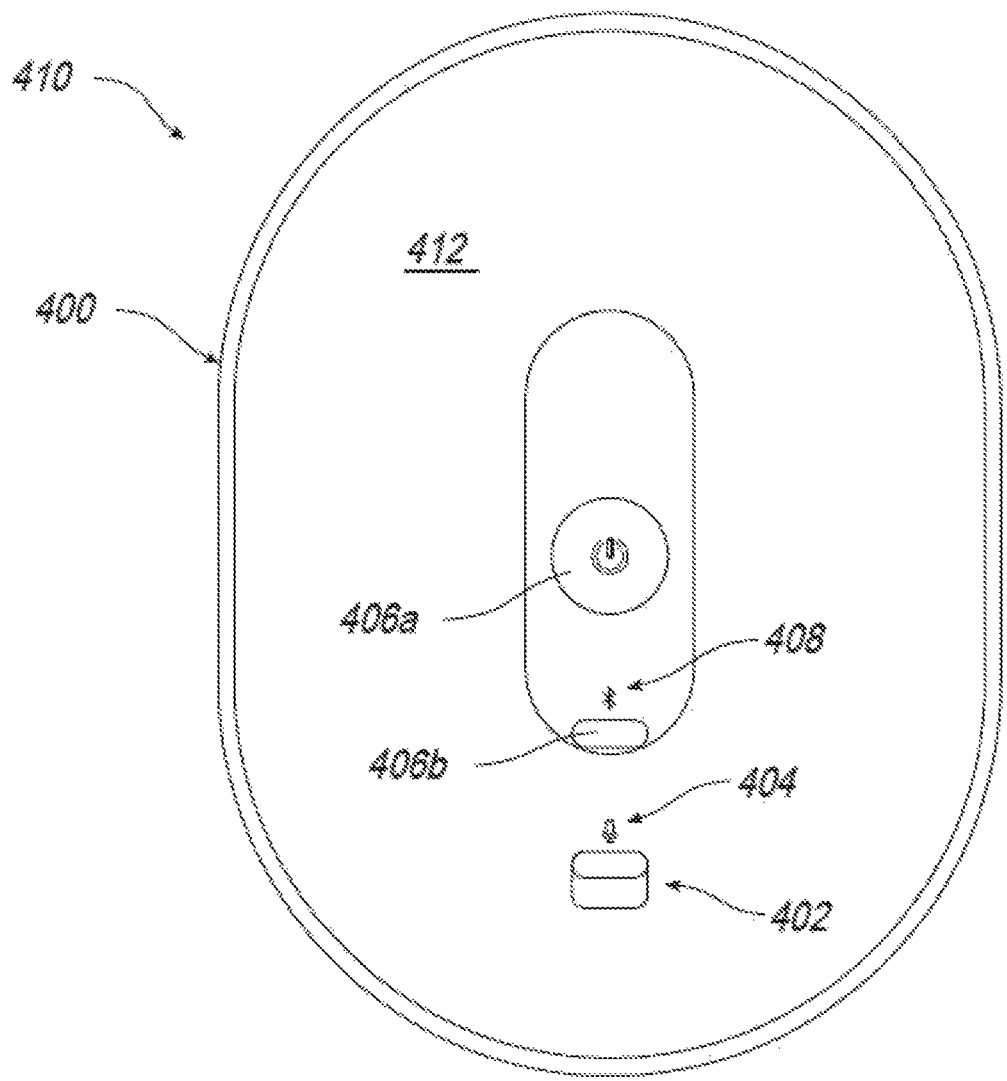
FIG. 4 is a plan view of a portion of one example of a housing for a network device in accordance with aspects of the disclosure.

Referring to FIG. 4, there is illustrated an example of a network device 410 showing a portion of a housing 400 incorporating various elements of a user interface, such as an example of the user interface 113 discussed above. The network device 410 may be similar to, or the same as, any of the examples of playback devices 110 (including NMD-enabled playback devices) or NMDs 120 discussed above. In certain examples, the housing 400 may correspond to an example of the housing 300 discussed above with reference to FIG. 3.

As shown in FIG. 4, the network device 410 includes a microphone switch 402 that may be used to turn the microphone(s) of the network device 410 on or off. Accordingly, the microphone switch 402 may be positioned near a microphone icon 404. As discussed in more detail below, the microphone switch 402 may be embodied in a mechanical switch that physically enables and disables the microphone (s) of the network device 410 via hardware. For example, when the microphone switch 402 is in the on position, a microphone control circuit may be closed and the microphone(s) may receive power (e.g., via a voltage regulator). However, when the microphone switch 402 is in the off position, the microphone circuit may be open and the microphone(s) may be incapable of receiving power necessary for operation.

In the illustrated example, the network device 410 further includes a power button 406a and a BLUETOOTH enable button 406b that may be used to activate certain communication functionality of the network device 410. For example, a user may press the BLUETOOTH enable button 406b to cause the network device 410 to enter a pairing mode to connect to other BLUETOOTH enabled devices. In certain examples, functions that some users might utilize with some frequency, such as volume control, for example, may be controlled via buttons 206 that are located in a readily accessible area, such as the top portion 304 of the housing 300, as discussed above with reference to FIG. 3. Other controls that a user may access with less frequency, such as the microphone switch 402, power button 406a, and BLUETOOTH enable button 406b, may be positioned in a less accessible, but also less noticeable area, such as on a bottom portion 412 of the housing 400, as shown in FIG. 4. This may reflect that users might not need to access the microphone switch 302 as frequently if the voice assistant can be disabled via a separate voice assistant control button (e.g., 306d) that may be located on the top portion 304 of the housing 300, for example. However, in other examples, the microphone switch 402 (and/or the power button 406a and BLUETOOTH enable button 406b) need not be located on the bottom portion 412 of the housing 400, but may instead be located elsewhere on the housing 400. In addition, in other examples, the network device 410 may not include the BLUETOOTH enable button 406b, or may include a button in the same or a similar location as the BLUETOOTH enable button 406b, but having a different function.

Figure 5A:
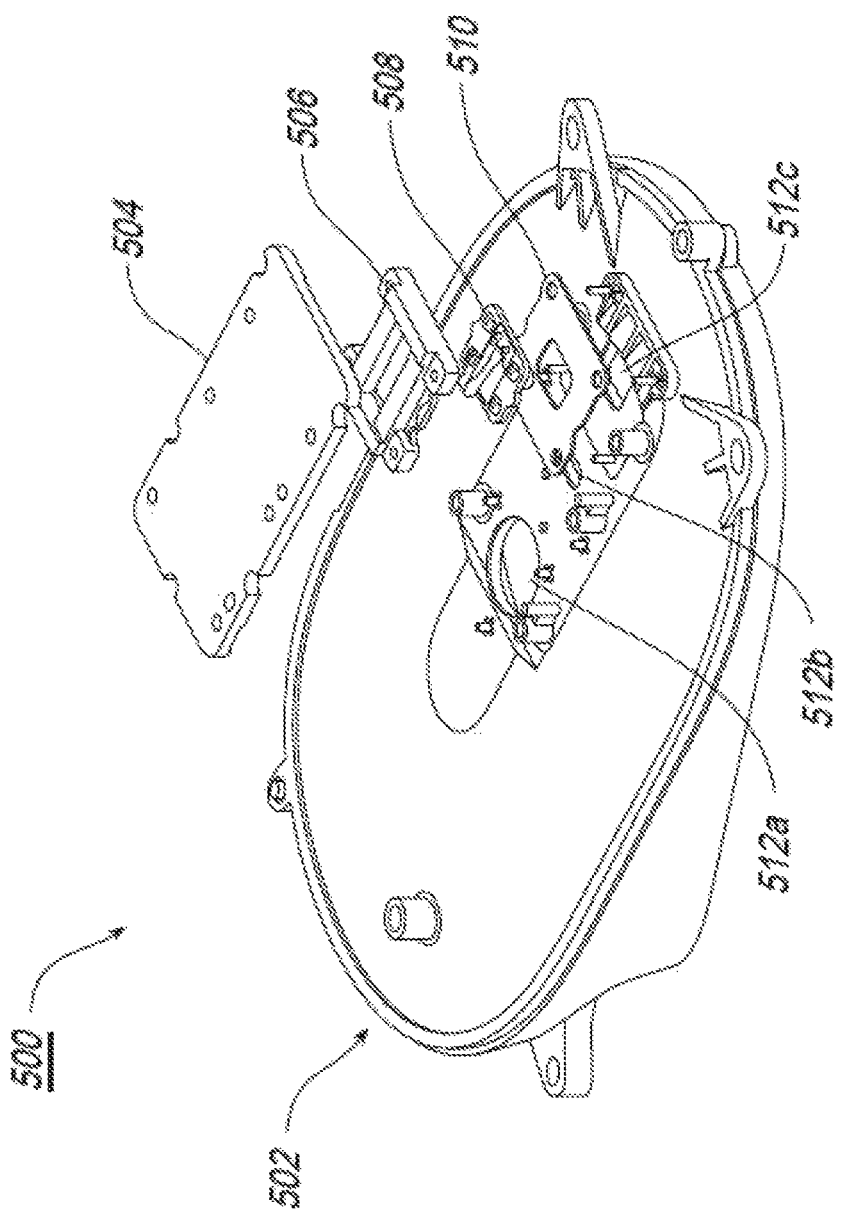
FIGS. 5A and 5B are partial exploded views of one example of a device assembly forming part of a network device in accordance with aspects of the disclosure.
Figure 5B:
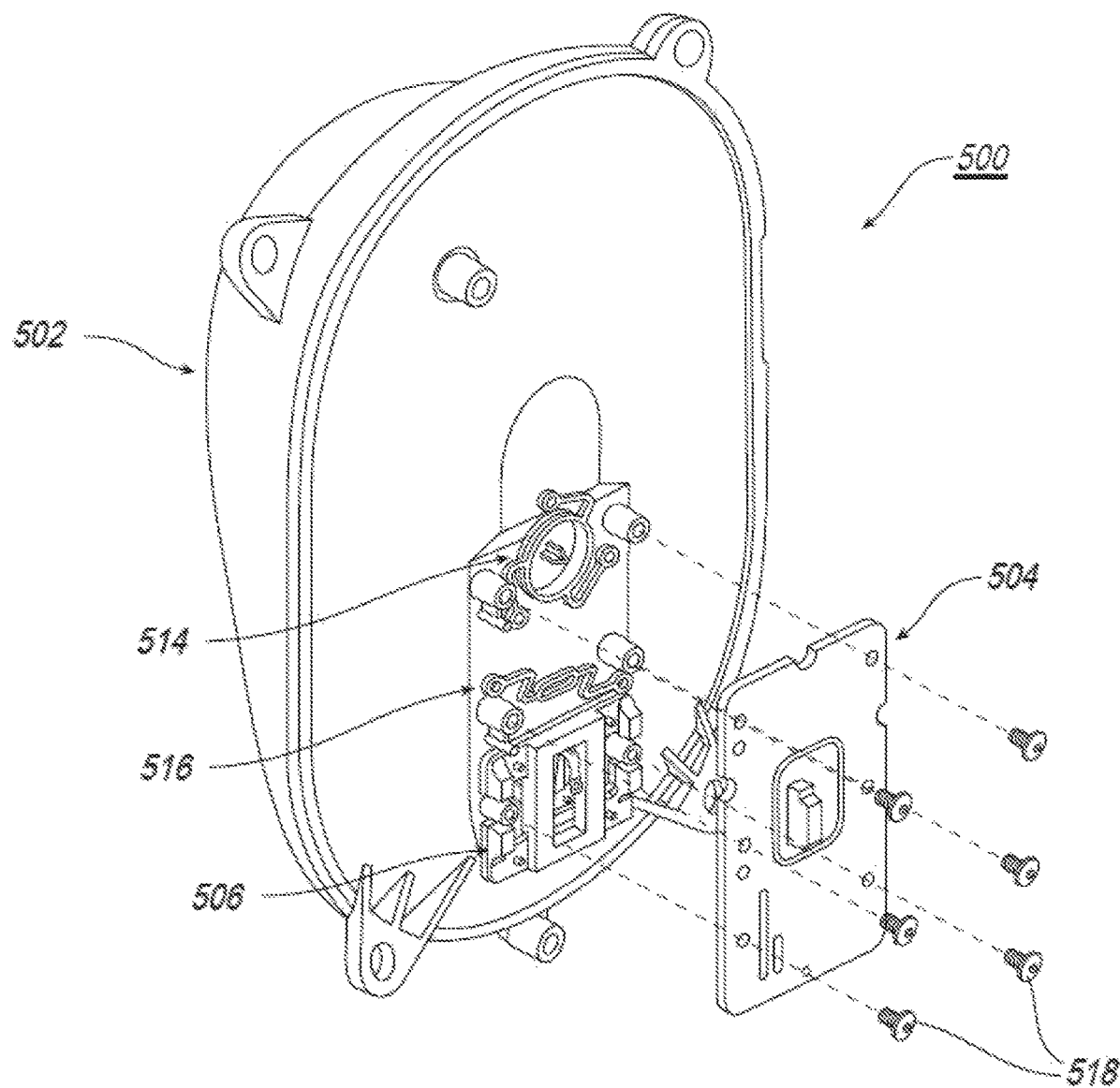

FIGS. 5A and 5B are partial exploded views illustrating a device assembly 500 that may be a portion of the network device 410 and which includes an example of the microphone switch 402 according to certain embodiments. The device assembly 500 includes a housing sub-assembly 502, which may include the bottom portion 412 of the housing 400, a button board 504, a slider cage 506, a switch sub-assembly 508, and a liner 510. Examples of these components are discussed in more detail below. The housing sub-assembly 502 may include openings 512a to accommodate the power button 406a, 512b to accommodate the BLUETOOTH enable button 406b, and 512c to accommodate the microphone switch 402. FIG. 5B illustrates portions of a button assembly 514 that may correspond to the power button 406a and a button assembly 516 that may correspond to the BLUETOOTH enable button 406b. Those skilled in the art will appreciate, given the benefit of this disclosure, that the housing sub-assembly 502 and device assembly 500 may vary in configuration to accommodate one or more buttons other than the power button 406a and BLUETOOTH enable button 406b. Accordingly, the examples shown in FIGS. 5A and 5B are illustrative only. As shown in FIG. 5B, after the slider cage 506, switch sub-assembly 508 and liner 510 have been assembled onto the housing sub-assembly 502, the button board 504 may be attached, overlying the slider cage 506 and button assemblies 514, 516. The button board may be attached to the housing sub-assembly 502 with a plurality of fasteners 518, such as screws, for example.

The button board 504 may include various electronics and/or other components that allow user interface elements, such as the microphone switch 402 and buttons 406 (and/or optionally other user interface elements not shown in FIG. 4), to make electrical connections with electronics of the network device 500 (such as electronics 112 discussed above (FIG. 1C), for example) to implement the desired action(s) associated with the user interface elements.

Figure 6:
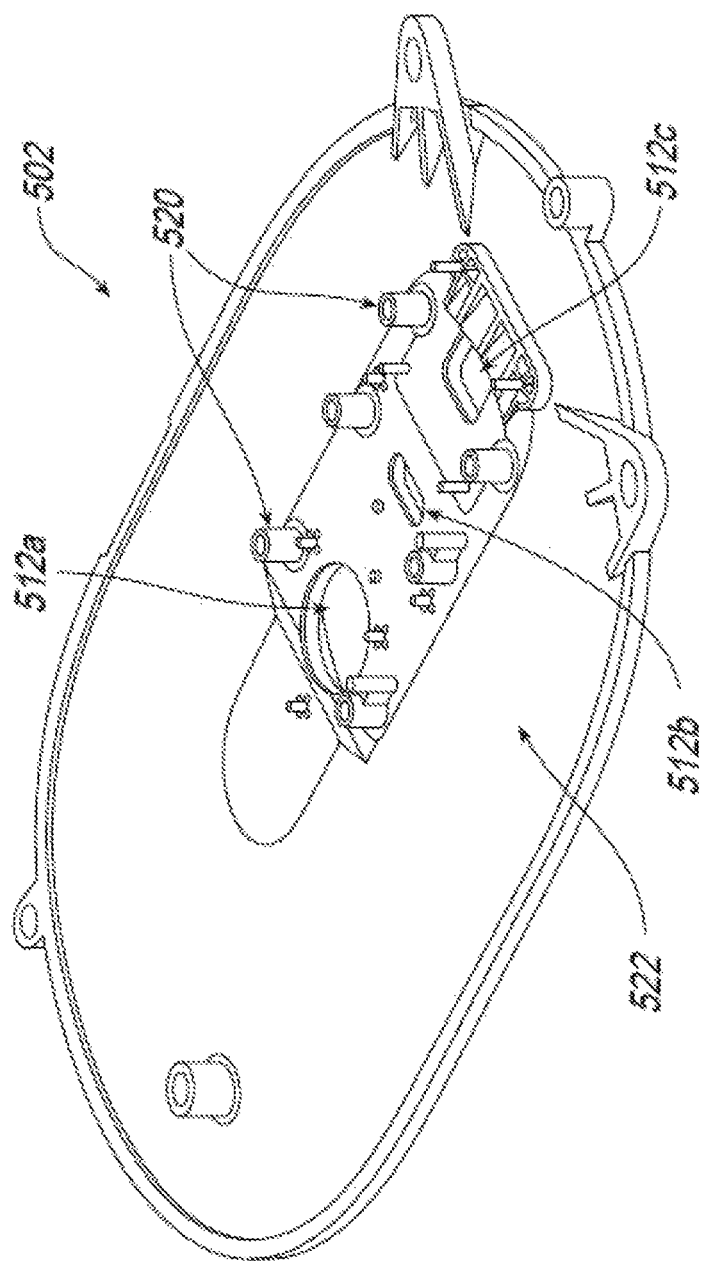
FIG. 6 is an isometric view of one example of a housing sub-assembly that may be used as part of the device assembly of FIGS. 5A and 5B in accordance with aspects of the disclosure.

The housing sub-assembly 502 may be made of a rigid plastic or other material that may provide structural support for components associated therewith or attached thereto. FIG. 6 illustrates an example of the housing sub-assembly 502. The housing sub-assembly 502 may be configured to be attached to side portions of the housing (e.g., housings 300 or 400) of the network device 500. In the example shown in FIGS. 5A, 5B, and 6, the housing sub-assembly 502 includes a plurality of posts 520 configured to receive the fasteners 518 that secure the button board 504 to the housing sub-assembly 502. The posts 520 may have a height that defines a cavity region or space between a surface 522 of the housing sub-assembly 502 and the button board 504. The height of the posts 520 may be selected to provide sufficient space in the cavity region to accommodate the slider cage 506, switch sub-assembly 508, and liner 510, as well as the button assemblies 514, 516.

Figure 7A:
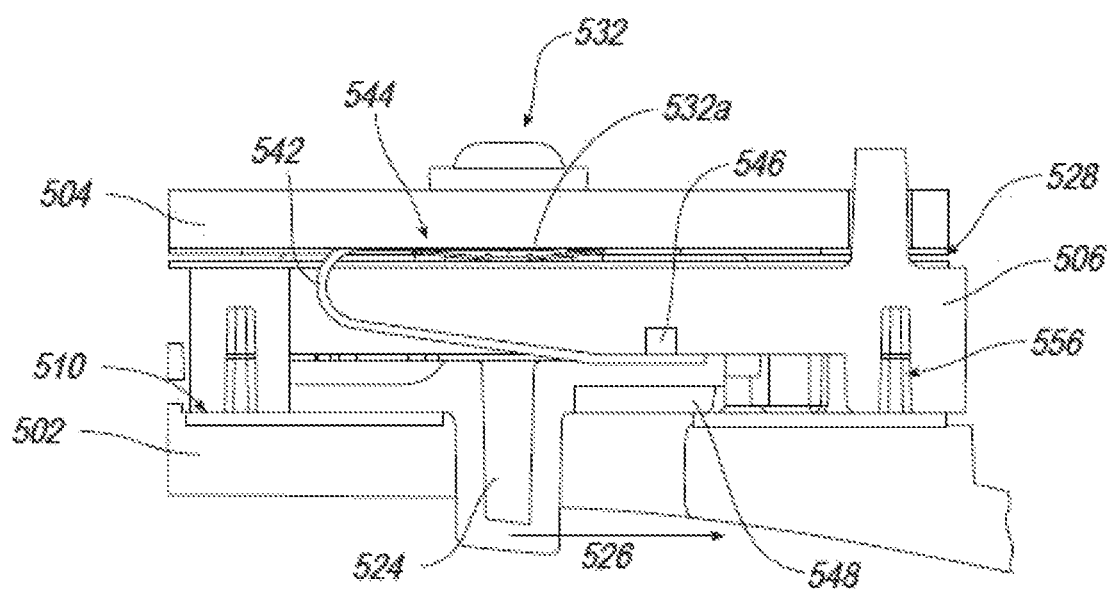
FIG. 7A is a side cross-sectional view of one example of the device assembly of FIGS. 5A and 5B in accordance with aspects of the disclosure.
Figure 7B:
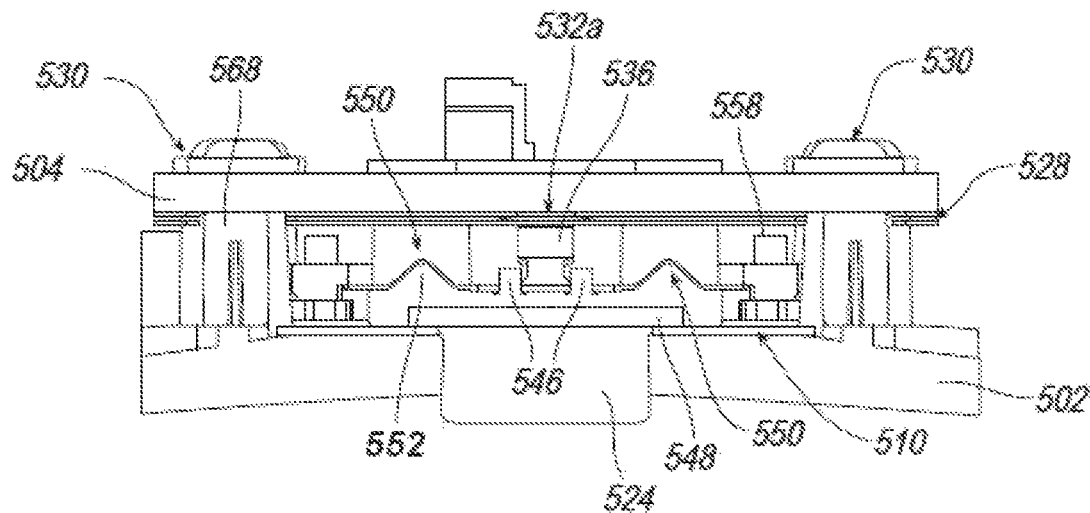
FIG. 7B is a front cross-sectional view of the example of the device assembly of FIGS. 5A, 5B, and 7A in accordance with aspects of the disclosure.

FIGS. 7A and 7B illustrate cross-sectional views of an example of the device assembly 500. FIG. 7A is a side cross-sectional view, showing the microphone switch 402 in the on position, and FIG. 7B is a front cross-sectional view. As shown, the switch sub-assembly 508 (FIG. 5A) includes an actuator portion 524 that protrudes through the opening 512c (FIGS. 5A and 6) in the housing sub-assembly 502 such that it may be grasped and actuated by a user of the network device 410. Arrow 526 in FIG. 7A illustrates a direction of throw (movement) of the switch sub-assembly 508.

As discussed above, according to certain embodiments, the device assembly 500 may be configured to meet certain ingress protection ratings that require a level of waterproofing (or water resistance). In particular, in certain circumstances, water (or other liquids) may penetrate through the openings 512a, 512b, 512c in the housing sub-assembly 502 into the region around the slider cage 506 and switch sub-assembly 508. However, to prevent this liquid from penetrating further into the interior of the network device 410, the button board 504 may include an overlay material 528, which may be a waterproof adhesive coating, that provides a waterproof seal and prevents liquid from reaching the interior electronics. To allow actuation of the buttons 406 through this waterproof seal, the power button 406a and/or BLUETOOTH enable button 406b may be implemented using snap dome buttons 530, as shown in FIG. 7B. Snap domes, also referred to as tactile domes, are normally open momentary contacts that provide a crisp tactile feel, letting the user know that the button was pressed. Snap domes are typically metal, although other materials may be used. When the dome is depressed (e.g., when a user presses the button 406), an electrical connection is made between the snap dome 530 and electronics (not shown) on the button board 504. Because movement of the dome is "vertical" (in the orientation shown in FIGS. 7A and 7B), the snap dome can be actuated through the waterproof adhesive coating 528 without disrupting the seal.

According to certain embodiments, a similar arrangement is used for the microphone switch 402; however, the user action includes sliding the actuator portion 524 of the switch sub-assembly 508, rather than pressing a button, as may be the case for the buttons 406, for example. Accordingly, as shown in FIGS. 7A and 7B, in certain examples, the button board 504 includes a snap dome 532 that is configured to be actuated via the switch sub-assembly 508. The switch sub-assembly 508 is configured to translate the sliding motion of the switch into a "button press" type action that can actuate the snap dome 532. Thus, the user experience may be the sliding motion of actuating a mechanical sliding switch, but the electrical actuation may be implemented using the snap dome 532 that can operate through a waterproof seal in a way that a sliding switch alone cannot.

Figure 13:
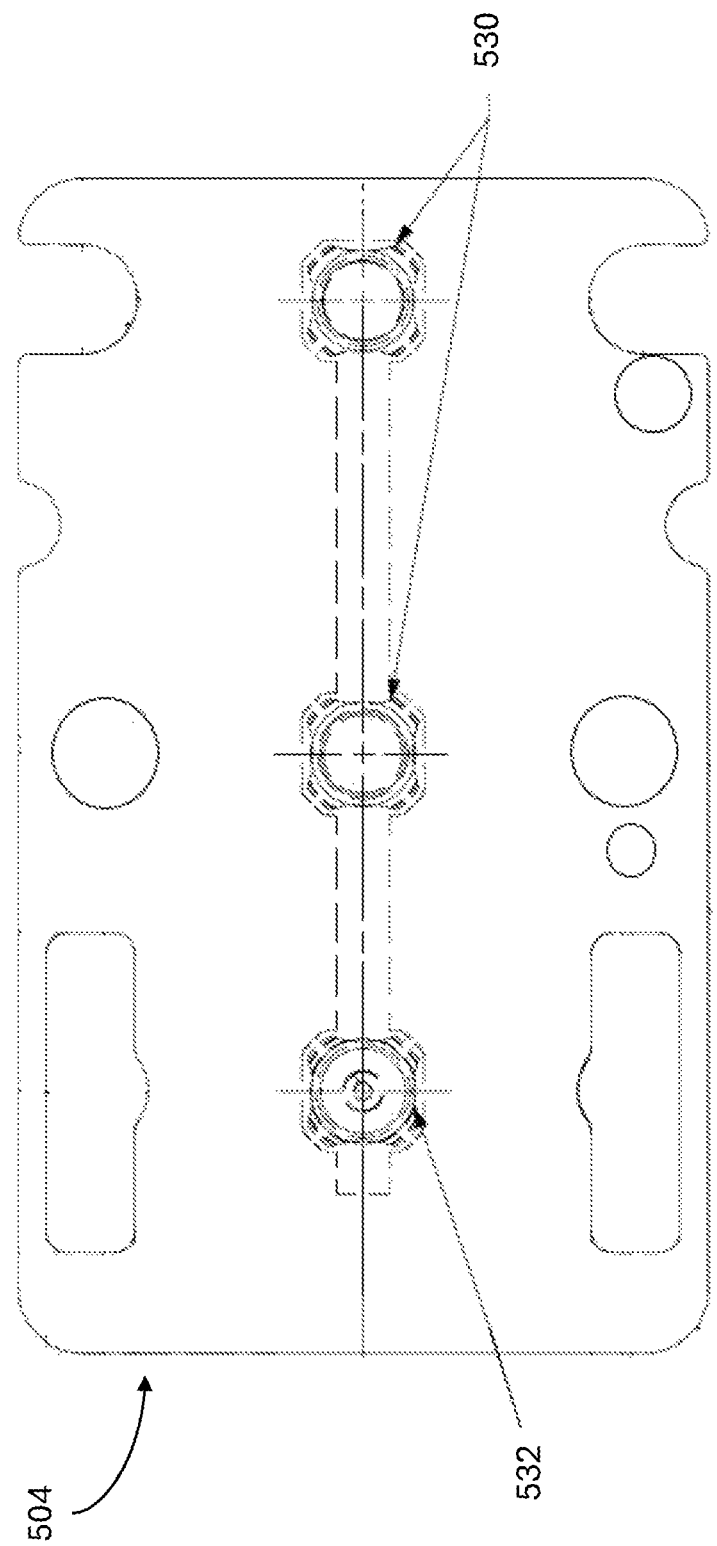
FIG. 13 is a front plan view of one example of a button board including snap domes in accordance with aspects of the disclosure.

FIG. 13 illustrates an example of one implementation of the button board 504, showing an example of the snap dome 532 and snap domes 530 as may be used for the power button 406a and/or BLUETOOTH enable button 406b, as described above.

Figure 8:
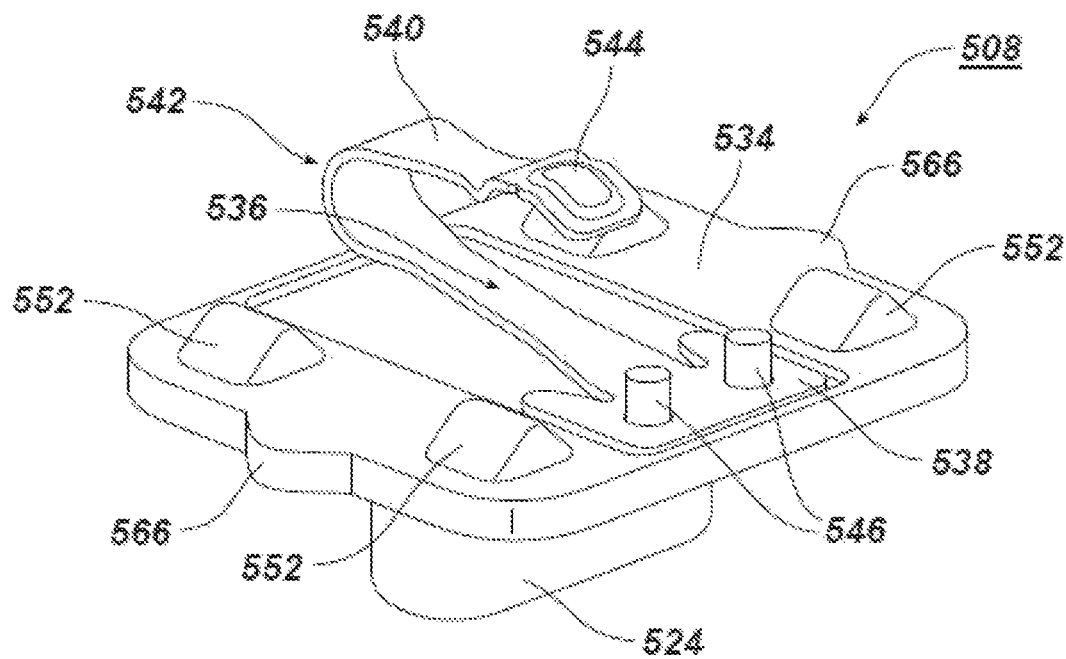
FIG. 8 is an isometric view of one example of a switch sub-assembly in accordance with aspects of the disclosure.

FIG. 8 illustrates an example of the switch sub-assembly 508, operation of which is described with reference to FIGS. 7A, 7B, and 8. According to certain embodiments, the switch sub-assembly 508 includes a body portion 534 that includes the actuator portion 524. In certain examples, the body portion 534 and actuator portion 524 are one monolithic structure (rather than being two pieces connected together). The body portion 534 (and actuator portion 524) may be made of plastic, for example. The switch sub-assembly 508 includes a spring 536 that is coupled to the body portion 534. The spring 536 includes a base 538 and an arm 540 extending from the base 538. In certain examples, the spring 536 (including the base 538 and the arm 540) is one monolithic structure, formed from a single piece of material. The spring arm 540 includes an inflection region 542 such that the arm curves upward away from the base 538 to provide a contact portion 544 that engages a region 532a of the snap dome 532, as shown in FIG. 7A. In certain examples, the spring 536 is made of metal. For example, the spring 536 may be a stamped metal spring. In certain examples, the spring 536 is made of stainless steel (e.g., 1/2H 301 stainless steel) to avoid any corrosion issues since, as discussed above, it is possible that the spring 536 may be in contact with water or other liquids at times.

The switch sub-assembly 508 is slidably coupled with the slider cage 506. When a user slides the actuator portion 524 into the on position, the switch sub-assembly 508 moves laterally along the slider cage 506 and the contact portion 544 of the spring arm 540 slides onto and engages the region 532a of the snap dome 532. Thus, the spring 536 "presses" the snap dome 532 and causes the electrical connection that may activate the microphone(s) of the network device 410. Similarly, when the switch is slid into the off position, pressure contact between the contact portion 544 of the spring arm 540 and the region 532a of the snap dome 532 is released, and the electrical connection may be broken such that the microphone(s) are turned off (disabled). In this manner, the spring 536 converts the lateral sliding motion of the switch sub-assembly 508 into a vertical button press type action that actuates the snap dome 532. The inflection region 542 may be configured to accommodate tolerances and manufacturing variations, for example, in the spacing between the base 538 of the spring 536 and the contact region 532a of the snap dome 532. For example, if the spring 536 were straight instead of having the folded structure provided by the inflection region 542, very precise manufacturing and assembly may be required to have the spring exert the proper force against the region 532a of the snap dome 532. Having the inflection region 542 allows for "play" and flexibility in the spring 536, improving reliability of operation and reducing precision requirements for manufacture and/or assembly of various components of the device assembly 500. In addition, the shape of the spring 536 may preserve the tactility of the slider cage 506 (discussed below) in examples where there are low frictional forces between the metal spring 536 and the overlay material 528.

In certain examples, the trip force (i.e., amount of force or pressure required to cause the snap dome to deform sufficiently to form an electrical connection with the associated electronics) for the snap dome 532 may be lower than is typically used for snap domes that are operated using conventional buttons, such as the snap domes 530, for example. When the snap dome is actuated via a user button press, the trip force provides tactile feedback to the user, such that the user feels the associated button "click" for example. However, according to certain embodiments, tactile feedback to the user may be supplied via the switch sub-assembly 508, as discussed further below, and accordingly, there is no need for the trip force of the snap dome 532 to provide this feedback. Accordingly, the trip force for the snap dome 532 may be made lower, for example, in a range of approximately 50-110 grams (e.g., approximately 80 grams), so as to require less pressure to be applied by the spring 536 in order to actuate the snap dome 532. This may simplify the construction of the spring 536 and provide more reliable actuation of the snap dome 532. In contrast, the trip force for the snap domes 530 may in a range of 320-380 grams, for example.

According to certain examples, the spring 536 may be coupled to the body portion 534 of the switch sub-assembly 508 using a pair of heat stakes 546. Heat staking is a joining technology used to join two or more parts together where at least one part (in this case, the body portion 534 of the switch sub-assembly 508) is made out of plastic. The process melts and deforms the plastic material of the heat stakes 546 using heat and force for a set process time. In other examples, the spring 536 may be coupled to the body portion 534 using another technique, such as fastening via one or more fasteners (e.g., screws, rivets, etc.), adhesion (e.g., glue, an adhesive tape, etc.), or other methods.

According to certain examples, the switch sub-assembly 508 may include an indicator 548 that provides a visual indication of the status of the microphone switch 402, and therefore of the microphone(s) of the network device 410. In the example shown in FIG. 7A, the indicator 548 is visible through the opening 512c when the switch is in the on position. Accordingly, the indicator 548 may include a color (e.g., a green region) or other visual indicator (e.g., the word "ON") that signifies to the user that the device microphone(s) is/are on. When the switch is slid in the direction of arrow 526, into the off position, the indicator 548 may be hidden by the housing sub-assembly 502. However, as will be appreciated by those skilled in the art, given the benefit of this disclosure, numerous other configurations for the indicator 548 may be implemented. For example, the indicator 548 may instead be positioned such that it is visible to the user when the switch is in the off position. In such examples, the indicator may include a color (e.g., red), word (e.g., OFF), or other symbol that signifies to the user than the device microphone(s) is/are disabled. In other examples, the switch may be operable between more than two positions, as discussed further below, and the indicator 548 may include one or more visual indicators that are positioned to inform the user as to the position of the switch and status of the associated components.

In various examples discussed herein, the switch sub-assembly 508 includes the spring 526 that acts as the interface (or translation mechanism) between the sliding motion of the switch and the electrical actuation provided by the snap dome 532. However, in other examples, the spring 526 may be replaced with an alternate component. For example, certain implementations may use a hard plunger that slides/rolls across and presses the contact region 532a of the snap dome 532 when the switch sub-assembly 508 is slid from one position to another.

Figure 9:
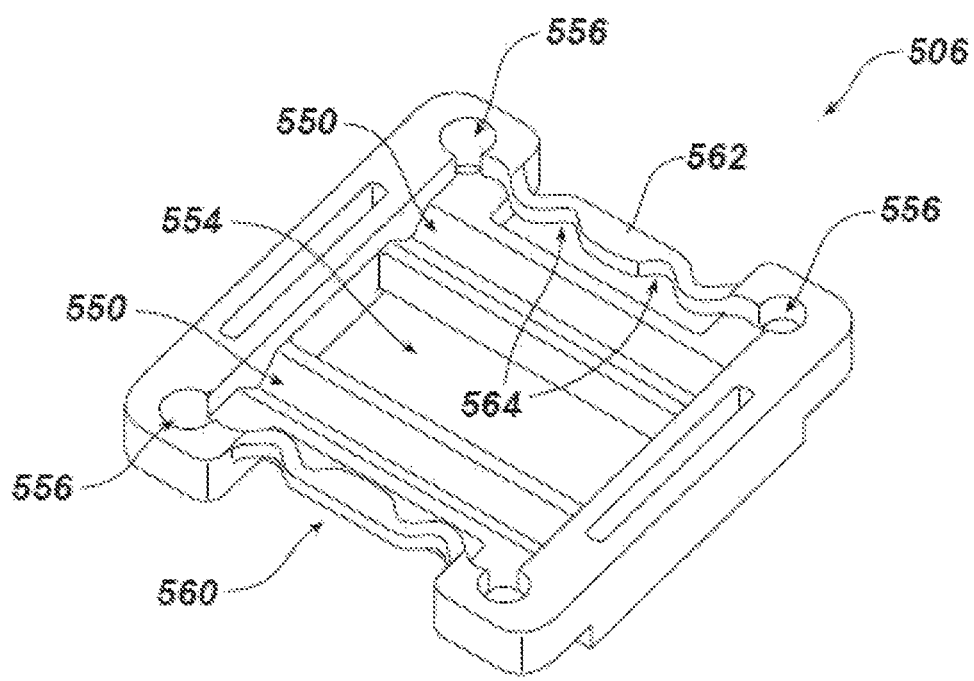
FIG. 9 is an isometric view of one example of a slider cage in accordance with aspects of the disclosure.

As discussed above, the switch sub-assembly 508 is slidably coupled with the slider cage 506 and laterally slides back and forth within the slider cage 506 as the user engages the actuator portion 524. FIG. 9 illustrates an example of the slider cage 506 according to certain embodiments. In certain examples, the slider cage 506 includes a pair of V-shaped grooves ("V-grooves") 550. The V-grooves 550 act as an interface between the slider cage 506 and the switch sub-assembly 508 and help to keep the switch sub-assembly straight during its throw. Referring again to FIG. 8, the body portion of the switch sub-assembly 508 includes V-shaped protrusions 552 that fit into the V-grooves 550 of the slide cage 506, as shown in FIG. 7B, for example. The V-grooves 550 retain the V-shaped protrusions 552 (which slide along the channels of the V-grooves as the switch sub-assembly 508 slides between positions) and prevent the switch sub-assembly 508 from moving side-to-side, thus keeping it aligned during its throw. In certain examples, the slider cage 506 and the body portion 534 of the switch sub-assembly 508 are made of low-friction materials so as to reduce friction between the V-shaped protrusions 552 and the V-grooves 550 as the switch sub-assembly 508 slides. In one example, the body portion of the switch sub-assembly 508 is made of polycarbonate and the slider cage 506 is made of an acetal homopolymer (Polyoxymethylene POM), such as Delrin® produced by Dupont. In certain examples, Delrin® may be a preferred choice of material as it combines low-friction and high-wear resistance with high strength and stiffness, which may be desirable attributes for the slider cage 506.

Figure 10:
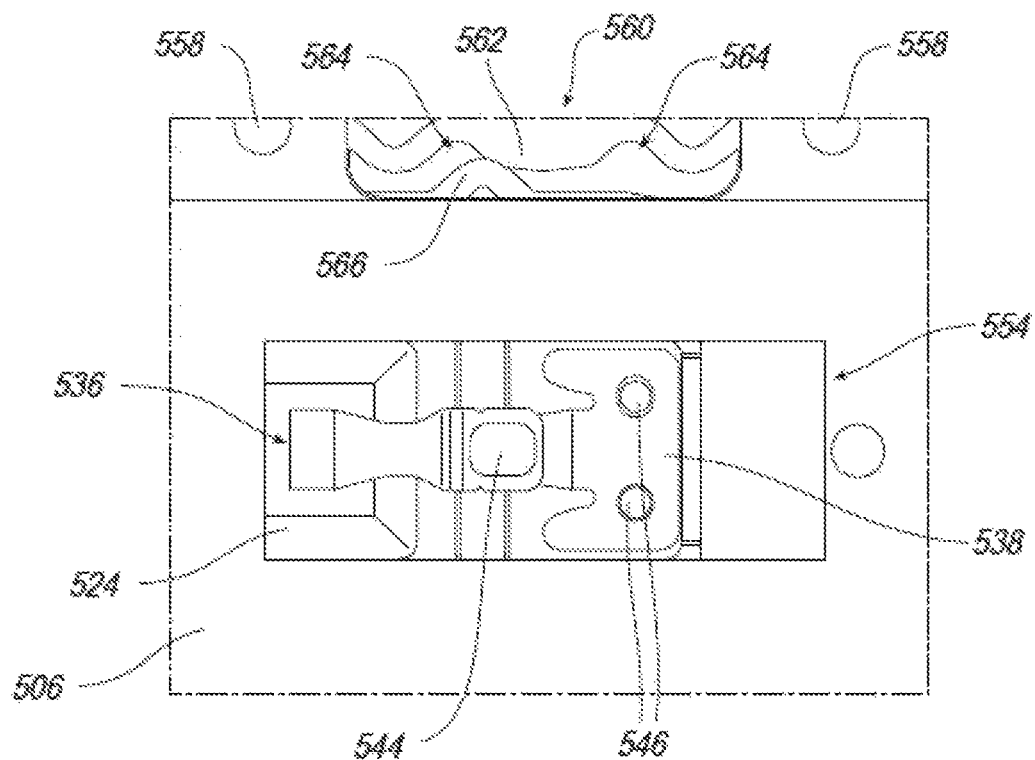
FIG. 10 is a top plan view of example of a partial assembly including the switch sub-assembly of FIG. 8 and the slider cage of FIG. 9 in accordance with aspects of the disclosure.

According to certain examples, the slider cage 506 includes an opening 554 that accommodates the spring 526, as shown in FIGS. 5B and 10, for example. The opening 554 allows the spring 536 to extend upwards such that the contact portion 544 can slide onto and off the region 532a of the snap dome 532, as discussed above. In the illustrated examples, the opening 554 is shown as rectangular; however, in other examples it may have varying shapes (such as rounded corners, "cut-off" corners, an oval shape, etc.) provided that the opening is sufficiently large and shaped to allow the spring 536 to move freely back and forth without interference.

Referring again to FIGS. 8 and 9, according to certain embodiments, the slider cage 506 and switch sub-assembly 508 include features that provide tactile feedback to the user as the user engages the actuator portion 524 to slide the switch 402. In certain examples, the slider cage 506 includes a pair of shaped tactile regions 560 located on either side of the slide cage 506, as shown in FIG. 9. In the illustrated example, each tactile region 560 includes a central region 562 with a pair of grooves 564 located on either side of the central region 562. The switch sub-assembly 508 may include a pair of corresponding tactile protrusions 566 located on either side of the body portion 534, as shown in FIG. 8. Referring to FIG. 10, as the switch sub-assembly 508 slides within the slider cage 506, the tactile protrusions 566 on the switch sub-assembly 508 slide across the tactile regions 560 of the slider cage 506. The tactile regions 560 may be configured as spring arms that have some flexibility to deform slightly due to the force exerted by the tactile protrusions 566, thus allowing the switch sub-assembly 508 to slide, but providing tactile feedback to the user in the form of the force required to move the actuator portion 524. In the illustrated example, the tactile protrusions 566 slide from one groove 564 across the central region 562 into the other groove 564. The central region 562 provides increased frictional interference between the slider cage 506 and the switch sub-assembly 508, such that the user feels a tactile resistance as they slide the switch 402. Further, the transitions of the tactile protrusion 566 out of and into the grooves 564 may provide the user with a "clicking" feel corresponding to the switch 402 moving from the open position to the closed position, and vice versa. Thus, as discussed above, the slider cage 506 and switch sub-assembly 508 can be configured to provide tactile feedback to the user, removing the need for the snap dome 532 to provide any such feedback. The snap dome 532 is decoupled from the user experience, simply providing a mechanism by which to achieve the electrical connection through a waterproof seal. The tactile regions 560 may be configured based on the amount of force desired to be needed to throw the switch. For example, the thickness (and therefore stiffness) of the tactile regions 560 and/or the depth of the grooves 564 may be selected to provide a chosen level of resistance to movement of the switch sub-assembly 508.

In the example illustrated in FIGS. 9 and 10, the tactile regions 560 of the slider cage 506 each include two grooves 564, which may correspond to on and off positions for a two-position switch. However, in other examples, the switch may have three or more positions, rather than two. Accordingly, in such examples, the tactile regions 506 may be configured to accommodate multiple switch positions. For example, for a three-position switch, each tactile region 560 may include three grooves separated from one another by two central portions, corresponding to first, second, and third positions of the switch. Those skilled in the art will appreciate, given the benefit of this disclosure, that numerous other variations on the configuration of the tactile regions 560 may be implemented in accord with the principles disclosed herein. Accordingly, the example shown in FIGS. 9 and 10 is illustrative only.

Figure 11:
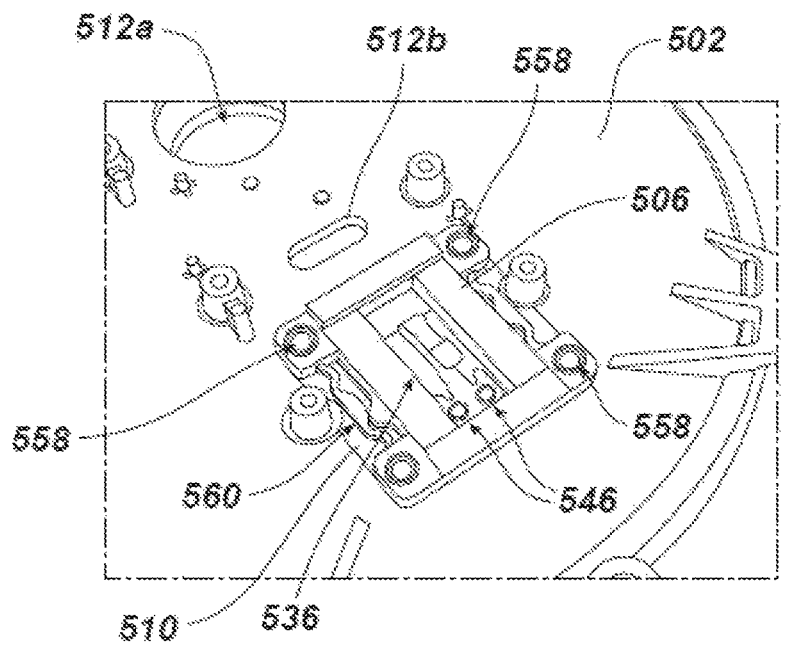
FIG. 11 is an isometric view of a partial assembly of a portion of an example of the device assembly of FIGS. 5A and 5B in accordance with aspects of the disclosure.

In certain examples, the slider cage 506 may be attached to the housing sub-assembly 502 using heat stakes 558. Accordingly, the slider cage 506 may include openings 556 to accommodate the heat stakes 558. However, in other examples, the openings 556 may be used to accommodate screws or other fasteners that can be used to attach the slider case 506 to the housing sub-assembly 502. FIG. 11 illustrates a partially assembled view of portions of an example of the device assembly 500, showing the slider cage 506 heat staked to the housing sub-assembly 502. In the illustrated example of FIGS. 9 and 11, the slider cage 506 includes four openings 556 located approximately in the corners of the slider cage 506; however in other examples, the slider cage 506 may include more than four or fewer than four openings 556 for fasteners, which may be located elsewhere on the slider cage 506.

In certain examples, the slider cage 506 may be further configured to provide additional support for the button board 504 beyond that provided by the fastening posts 520. Accordingly, the slider cage 506 may include one or more hard-stops 568 to support the button board 504, as shown in FIG. 7B, for example. By using the slider cage 506 to provide the hard-stops 568 for the button board 504, manufacturing and/or assembly tolerances, particularly in the vertical or "z-stack" dimension, may be simplified and variations in the z-stack dimension may be reduced. The button board 504 further traps the slider cage 506 within the device assembly 500. This may ensure that even if the heat-stakes 558 were to fall, the slider cage 506 may remain functional due to the compression forces from the button board 504.

Figure 12:
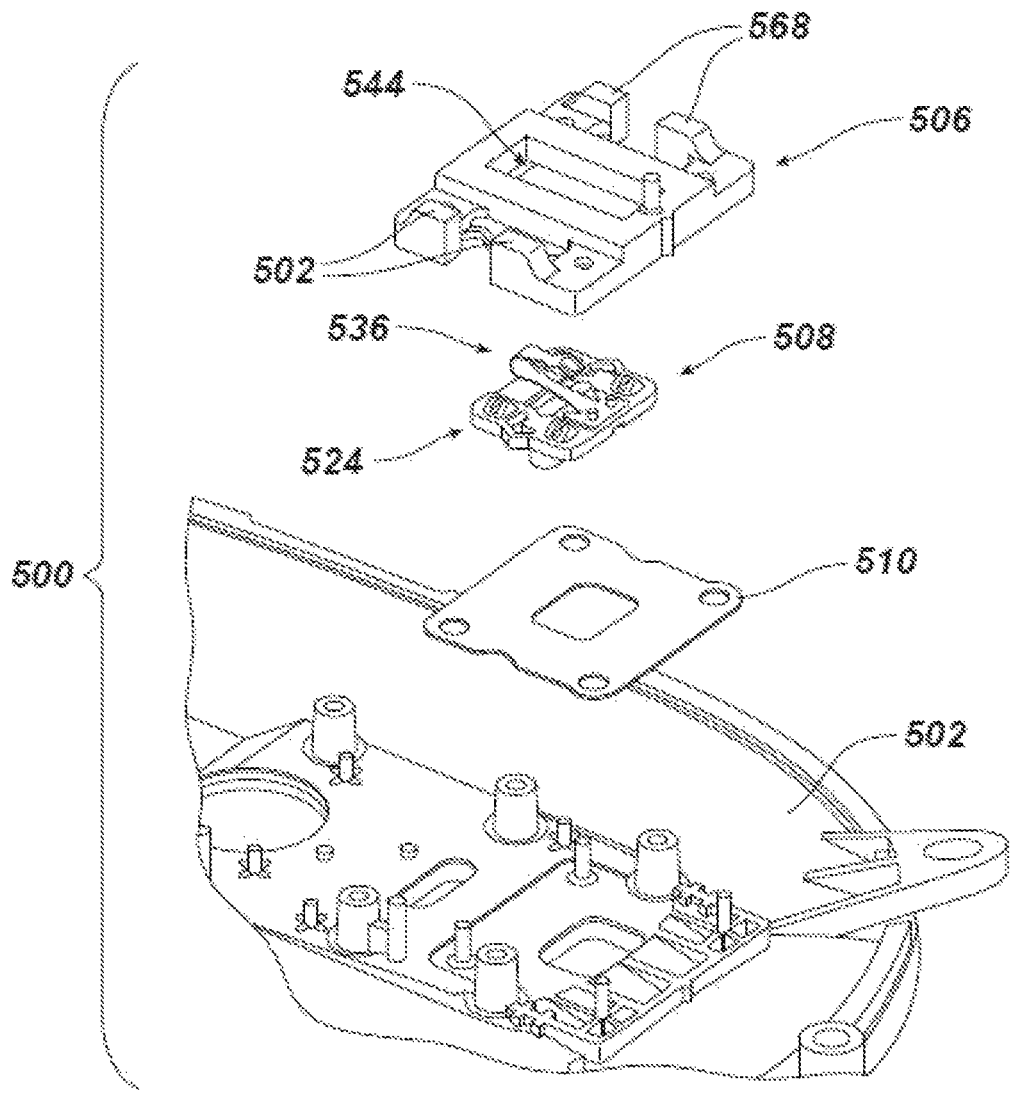
FIG. 12 is a partial exploded view of a portion of an example of the device assembly of FIGS. 5A and 5B in accordance with aspects of the disclosure.

As discussed above, in certain examples, the device assembly 500 includes a liner 510 positioned between the switch sub-assembly 508 and the housing sub-assembly 502, as shown in FIGS. 5A, 7A, 7B, 11, and 12, for example. FIG. 12 is a partial exploded view of a portion of an example of the device assembly 500 (excluding the button board 504), showing the liner 510 among other features. The liner 510 may provide a low-friction surface for the switch sub-assembly 508 to ride on. In certain examples, the liner 510 may be made of a fluoropolymer, such as polytetrafluoroethylene (PTFE), for example. In other examples, the device assembly 500 may omit the liner 510.

Thus, aspects and embodiments provide a switch assembly that incorporates a mechanical sliding switch that can be used to control one or more aspects of a network device 410, such as a playback device or NMD, for example. As discussed above, the switch assembly includes a spring 536 that acts as an interface between the mechanical sliding part of the switch assembly that is actuated by a user and the electrical part of the assembly that creates and breaks the electrical connection(s) that cause the desired function of the switch (e.g., turning on or off one or more components or features of the network device). Through the translation of the sliding motion into a "button press" type motion for electrical actuation, the switch assembly advantageously can operate in a network device that meets certain waterproofing standards, as discussed above.

In the examples discussed above, the switch 402 may be used to toggle the microphone(s) of the network device to either an on state or an off state. However, those skilled in the art will appreciate, given the benefit of this disclosure, that the switch 402 may be used for a variety of different purposes. For example, the switch 402 may be used as a power switch or WIFI enable/disable switch instead of a microphone switch. Further, as discussed above, the switch 402 may include more than two positions and therefore may perform more functions than simply turning on and off one component and/or feature. For example, as discussed above, certain network devices 410 may include voice assistant features. In certain examples, the switch 402 may be used to control the voice assistant features as well as the one or more microphones of the network device 410. For example, the switch 402 may be configured with an on position in which the voice assistant features and the one or more microphones are active, an intermediate position in which the voice assistant features are disabled but the one or more microphones remain on for other purposes, and an off position in which both the voice assistant features and the one or more microphones are disabled. In other examples, the switch 402 may be used to toggle between a cloud-based voice assistant service and a local voice assistant implemented on the network device 410 itself. U.S. Pat. No. 11,189,286, which is hereby incorporated herein by reference in its entirety for all purposes, describes examples of toggling between a cloud-based voice assistant service and a local voice assistant. Numerous other variations may be implemented in accord with the principles disclosed herein.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain aspects of the present disclosure can be practiced without certain, specific details. In other instances, well known methods, procedures, components, and circuitry have not been described in detail to avoid unnecessarily obscuring aspects of the examples and aspects of the present technology. Accordingly, the scope of the present disclosure is defined by the appended claims rather than the forgoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Examples

The present technology is illustrated, for example, according to various aspects described below. Various examples of aspects of the present technology are described as numbered examples for convenience. These are provided as examples and do not limit the present technology. It is noted that any of the dependent examples may be combined in any combination and placed into a respective independent example. The other examples can be presented in a similar manner.

(Example 1) A playback device comprising: a housing; one or more microphones housed within the housing; and a switch assembly configured to enable and disable the one or more microphones, the switch assembly comprising a slider cage positioned inside the housing and coupled to the housing, an electrical actuator, and a sliding switch sub-assembly configured to slide laterally between a first position and a second position along a path constrained by the slider cage, the sliding switch sub-assembly including an actuator portion that extends through an opening in the housing to an exterior of the playback device and a translation component that converts lateral motion of the sliding switch sub-assembly between the first and second positions into vertical motion that activates the electrical actuator to enable the one or more microphones when the sliding switch sub-assembly is in the first position and deactivates the electrical actuator to disable the one or more microphones when the sliding switch sub-assembly is in the second position.

(Example 2) The playback device of Example 1, wherein the translation component is a spring.

(Example 3) The playback device of Example 2, wherein the sliding switch sub-assembly comprises a monolithic body portion that includes the actuator portion, and wherein the spring is coupled to the body portion.

(Example 4) The playback device of Example 3, wherein the body portion is made of polycarbonate.

(Example 5) The playback device of one of Examples 3 or 4, wherein the spring is made of metal.

(Example 6) The playback device of any one of Examples 3-5, wherein the spring comprises a base coupled to the body portion and an arm extending away from the base, the arm including a contact portion that engages the electrical actuator and an inflection region configured to shape the arm such that the contact portion is positioned vertically offset from the base.

(Example 7) The playback device of any one of Examples 3-6, wherein the slider cage comprises a pair of V-shaped grooves, and the body portion includes a pair of V-shaped protrusions configured to fit within the V-shaped grooves, wherein the V-shaped grooves are configured to constrain the V-shaped protrusions to maintain alignment of the sliding switch sub-assembly as the sliding switch sub-assembly moves along the path between the first position and the second position.

(Example 8) The playback device of Example 7, wherein the slider cage further comprises a central opening positioned between the pair of V-shaped grooves, and wherein the sliding switch sub-assembly is positioned relative to the slider cage such that at least a portion of the spring extends through the central opening.

(Example 9) The playback device of any one of Examples 3-8, wherein the spring is coupled to the body portion by one or more heat stakes.

(Example 10) The playback device of any one of Examples 3-8, wherein the slider cage further includes at least one tactile region and wherein the body portion further includes a corresponding at least one tactile protrusion configured to engage the at least one tactile region as the sliding switch sub-assembly moves along the path between the first position and the second position, the tactile region being configured to at least partially set a force required to move the sliding switch sub-assembly between the first position and the second position.

(Example 11) The playback device of any one of Examples 1-10, wherein the slider cage is coupled to the housing by one or more heat stakes.

(Example 12) The playback device of any one of Examples 1-11, wherein the electrical actuator is a snap dome.

(Example 13) The playback device of Example 12, wherein the switch assembly further comprises a button board coupled to the housing and located within the housing, wherein the snap dome is mounted on the button board, and wherein the slider cage is positioned between the button board and the housing.

(Example 14) The playback device of Example 13, wherein the switch assembly further comprises a waterproof sealing layer disposed on a surface of the button board facing the slider cage.

(Example 15) The playback device of any one of Examples 12-14, wherein the snap dome has a trip force in a range of 50-110 grams (e.g., 80 grams+/−30 grams).

(Example 16) The playback device of any one of Examples 1-15, wherein the switch assembly further comprises a liner positioned between the sliding switch sub-assembly and the housing.

(Example 17) The playback device of Example 16, wherein the liner is made of polytetrafluoroethylene.

(Example 18) The playback device of any one of Examples 1-17, wherein the sliding switch sub-assembly further includes an indicator configured to provide a visual indication of a status of the one or more microphones.

(Example 19) The playback device of any one of Examples 1-18, wherein the sliding switch sub-assembly is further configured to slide laterally between the second position and a third position along a path constrained by the slider cage, and wherein, when the sliding switch sub-assembly is in the third position, the switch assembly is configured to control a voice assistant feature of the playback device.

(Example 20) A switch assembly comprising: a base; a slider cage coupled to the base; an electronics board including an electrical actuator; and a sliding switch sub-assembly configured to slide laterally between a first position and a second position along a path constrained by the slider cage, the sliding switch sub-assembly comprising a monolithic body portion including an actuator portion that extends from a first side of the body portion through an opening in the base and a translation component coupled to an opposing side of the body portion and configured to convert lateral motion of the sliding switch sub-assembly between the first and second positions into vertical motion that activates the electrical actuator to establish an electrical connection when the sliding switch sub-assembly is in the first position and to break the electrical connection when the sliding switch sub-assembly is in the second position; wherein the slider cage is positioned between the electronics board and the sliding switch sub-assembly.

(Example 21) The switch assembly of Example 20, further comprising a waterproof sealing layer disposed on a surface of the electronics board facing the slider cage.

(Example 22) The switch assembly of one of Examples 20 or 21, wherein the electrical actuator is a snap dome.

(Example 23) The switch assembly of Example 22, wherein the snap dome has a trip force in a range of 50-110 grams (e.g., 80 grams+/−30 grams).

(Example 24) The switch assembly of any one of Examples 20-23, further comprising a liner positioned between the sliding switch sub-assembly and the base.

(Example 25) The switch assembly of Example 24, wherein the liner is made of polytetrafluoroethylene.

(Example 26) The switch assembly of any one of Examples 20-25, wherein the slider cage is heat staked to the base.

(Example 27) The switch assembly of any one of Examples 20-26, wherein the body portion of the sliding switch sub-assembly is made of polycarbonate.

(Example 28) The switch assembly of any one of Examples 20-27, wherein the translation component is a spring.

(Example 29) The switch assembly of Example 28, wherein the spring is made of metal.

(Example 30) The switch assembly of one of Examples 28 or 29, wherein the spring comprises an arm including a contact portion that engages the electrical actuator and an inflection region configured to shape the arm such that the contact portion is positioned vertically above a region of the arm.

(Example 31) The switch assembly of any one of Examples 28-30, wherein the spring is coupled to the body portion by one or more heat stakes.

(Example 32) The switch assembly of any one of Examples 20-31, wherein the slider cage comprises a pair of V-shaped grooves, and the body portion of the sliding switch sub-assembly comprises a pair of V-shaped protrusions configured to fit within the V-shaped grooves, wherein the V-shaped grooves are configured to constrain the V-shaped protrusions to maintain alignment of the sliding switch sub-assembly as the sliding switch sub-assembly moves along the path between the first position and the second position.

(Example 33) The switch assembly of Example 32, wherein the slider cage further comprises a central opening positioned between the pair of V-shaped grooves, and wherein the sliding switch sub-assembly is positioned relative to the slider cage such that at least a portion of the translation component extends through the central opening to contact the electrical actuator.

(Example 34) The switch assembly of any one of Examples 20-33, wherein the slider cage further includes at least one tactile region and wherein the body portion of the sliding switch sub-assembly further includes a corresponding at least one tactile protrusion configured to engage the at least one tactile region as the sliding switch sub-assembly moves along the path between the first position and the second position, the tactile region being configured to at least partially set a force required to move the sliding switch sub-assembly between the first position and the second position.

(Example 35) The switch assembly of any one of Examples 20-34, wherein the base is a portion of a housing of a network device.

(Example 36) The switch assembly of Example 35, wherein the network device includes at least one microphone electrically coupled to the electronics board and housed within the housing, and wherein the electrical actuator is configured to establish the electrical connection to enable the at least one microphone when the sliding switch sub-assembly is in the first position and to break the electrical connection to disable the at least one microphone when the sliding switch sub-assembly is in the second position.

(Example 37) The switch assembly of Example 36, wherein the network device is a playback device.

(Example 38) The switch assembly of Example 35, wherein the electrical actuator is configured to establish the electrical connection to enable a cloud-based voice assistant feature associated with the network device when the sliding switch sub-assembly is in the first position and to break the electrical connection to disable the cloud-based voice assistant feature when the sliding switch sub-assembly is in the second position.

(Example 39) The switch assembly of Example 38, wherein the electrical actuator is further configured to establish another electrical connection to enable a local voice assistant feature associated with the network device when the sliding switch sub-assembly is in the second position.

(Example 40) The switch assembly of Example 35, wherein the network device includes at least one microphone electrically coupled to the electronics board and housed within the housing; wherein the sliding switch sub-assembly is further configured to move along the path to and from a third position; wherein, when the sliding switch sub-assembly is in the first position, the electrical actuator is configured to establish the electrical connection to enable the at least one microphone and to enable a voice assistant feature associated with the network device; wherein, when the sliding switch sub-assembly is in the third position, the electrical actuator is configured to disable the voice assistant feature; and wherein, when the sliding switch sub-assembly is in the second position, the electrical actuator is configured to break the electrical connection to disable the at least one microphone.

(Example 41) A playback device comprising a housing including a base, a slider cage coupled to the base, an electronics board housing within the housing and including an electrical actuator, and at least one microphone electrically coupled to the electronics board and housed within the housing. The playback device further comprises a sliding switch sub-assembly configured to slide laterally between a first position and a second position along a path constrained by the slider cage, the sliding switch sub-assembly comprising a monolithic body portion including an actuator portion that extends from a first side of the body portion through an opening in the base and a translation component coupled to an opposing side of the body portion and configured to convert lateral motion of the sliding switch sub-assembly between the first and second positions into vertical motion that activates the electrical actuator to establish an electrical connection to enable the at least one microphone when the sliding switch sub-assembly is in the first position and to break the electrical connection to disable the at least one microphone when the sliding switch sub-assembly is in the second position, wherein the slider cage is positioned between the electronics board and the sliding switch sub-assembly.

(Example 42) The playback device of Example 41, wherein the translation component is a spring, and wherein the spring comprises an arm including a contact portion that engages the electrical actuator and an inflection region configured to shape the arm such that the contact portion is positioned vertically above a region of the arm.

(Example 43) The playback device of one of Examples 41 or 42, wherein the electrical actuator is configured to establish the electrical connection to enable a cloud-based voice assistant feature associated with the network device when the sliding switch sub-assembly is in the first position and to break the electrical connection to disable the cloud-based voice assistant feature when the sliding switch sub-assembly is in the second position.

(Example 44) The playback device of Example 43, wherein the electrical actuator is further configured to establish another electrical connection to enable a local voice assistant feature associated with the network device when the sliding switch sub-assembly is in the second position.

(Example 45) The playback device of any one of Examples 41-44, wherein the sliding switch sub-assembly is further configured to move along the path to and from a third position, wherein, when the sliding switch sub-assembly is in the first position, the electrical actuator is configured to establish the electrical connection to enable the at least one microphone and to enable a voice assistant feature associated with the playback device, and wherein, when the sliding switch sub-assembly is in the third position, the electrical actuator is configured to disable the voice assistant feature.

The invention claimed is:

1. A playback device comprising:
   a housing;
   one or more microphones housed within the housing; and
   a switch assembly configured to enable and disable the one or more microphones, the switch assembly comprising
      a slider cage positioned inside the housing and coupled to the housing,
      an electrical actuator, and
      a sliding switch sub-assembly configured to slide laterally between a first position and a second position along a path constrained by the slider cage, the sliding switch sub-assembly including an actuator portion that extends through an opening in the housing to an exterior of the playback device and a spring that converts lateral motion of the sliding switch sub-assembly between the first and second positions into vertical motion that activates the electrical actuator to enable the one or more microphones when the sliding switch sub-assembly is in the first position and deactivates the electrical actuator to disable the one or more microphones when the sliding switch sub-assembly is in the second position.

2. The playback device of claim 1, wherein the sliding switch sub-assembly comprises a monolithic body portion that includes the actuator portion, and wherein the spring is coupled to the body portion.

3. The playback device of claim 2, wherein the spring comprises a base coupled to the body portion and an arm extending away from the base, the arm including a contact portion that engages the electrical actuator and an inflection region configured to shape the arm such that the contact portion is positioned vertically offset from the base.

4. The playback device of claim 2, wherein the slider cage comprises a pair of V-shaped grooves, and the body portion includes a pair of V-shaped protrusions configured to fit within the V-shaped grooves, wherein the V-shaped grooves are configured to constrain the V-shaped protrusions to maintain alignment of the sliding switch sub-assembly as the sliding switch sub-assembly moves along the path between the first position and the second position.

5. The playback device of claim 4, wherein the slider cage further comprises a central opening positioned between the pair of V-shaped grooves, and wherein the sliding switch sub-assembly is positioned relative to the slider cage such that at least a portion of the spring extends through the central opening.

6. The playback device of claim 2, wherein the slider cage further includes at least one tactile region and wherein the body portion further includes a corresponding at least one tactile protrusion configured to engage the at least one tactile region as the sliding switch sub-assembly moves along the path between the first position and the second position, the tactile region being configured to at least partially set a force required to move the sliding switch sub-assembly between the first position and the second position.

7. The playback device of claim 1, wherein the electrical actuator is a snap dome; and wherein the switch assembly further comprises a button board coupled to the housing and located within the housing, wherein the snap dome is mounted on the button board, and wherein the slider cage is positioned between the button board and the housing.

8. The playback device of claim 7, wherein the switch assembly further comprises a waterproof sealing layer disposed on a surface of the button board facing the slider cage.

9. The playback device of claim 1, wherein the sliding switch sub-assembly further includes an indicator configured to provide a visual indication of a status of the one or more microphones.

10. The playback device of claim 1, wherein the sliding switch sub-assembly is further configured to slide laterally between the second position and a third position along a path constrained by the slider cage, and wherein, when the sliding switch sub-assembly is in the third position, the switch assembly is configured to control a voice assistant feature of the playback device.

11. A switch assembly comprising:
   a base;
   a slider cage coupled to the base;
   an electronics board including an electrical actuator; and
   a sliding switch sub-assembly configured to slide laterally between a first position and a second position along a path constrained by the slider cage, the sliding switch sub-assembly comprising a monolithic body portion including an actuator portion that extends from a first side of the body portion through an opening in the base and a translation component coupled to an opposing side of the body portion and configured to convert lateral motion of the sliding switch sub-assembly between the first and second positions into vertical motion that activates the electrical actuator to establish an electrical connection when the sliding switch sub-assembly is in the first position and to break the electrical connection when the sliding switch sub-assembly is in the second position;
   wherein the slider cage is positioned between the electronics board and the sliding switch sub-assembly.

12. The switch assembly of claim 11, further comprising:
   a waterproof sealing layer disposed on a surface of the electronics board facing the slider cage; and
   a liner positioned between the sliding switch sub-assembly and the base.

13. The switch assembly of claim 11, wherein the translation component is a spring; and wherein the spring comprises an arm including a contact portion that engages the electrical actuator and an inflection region configured to shape the arm such that the contact portion is positioned vertically above a region of the arm.

14. The switch assembly of claim 11, wherein the slider cage comprises a pair of V-shaped grooves and a central opening positioned between the pair of V-shaped grooves; wherein the body portion of the sliding switch sub-assembly comprises a pair of V-shaped protrusions configured to fit within the V-shaped grooves, wherein the V-shaped grooves are configured to constrain the V-shaped protrusions to maintain alignment of the sliding switch sub-assembly as the sliding switch sub-assembly moves along the path between the first position and the second position; and wherein the sliding switch sub-assembly is positioned relative to the slider cage such that at least a portion of the translation component extends through the central opening to contact the electrical actuator.

15. The switch assembly of claim 11, wherein the slider cage further includes at least one tactile region and wherein the body portion of the sliding switch sub-assembly further includes a corresponding at least one tactile protrusion configured to engage the at least one tactile region as the sliding switch sub-assembly moves along the path between the first position and the second position, the tactile region being configured to at least partially set a force required to move the sliding switch sub-assembly between the first position and the second position.

16. A playback device comprising:
a housing including a base;
a slider cage coupled to the base;
an electronics board housed within the housing and including an electrical actuator;
at least one microphone electrically coupled to the electronics board and housed within the housing; and
a sliding switch sub-assembly configured to slide laterally between a first position and a second position along a path constrained by the slider cage, the sliding switch sub-assembly comprising a monolithic body portion including an actuator portion that extends from a first side of the body portion through an opening in the base and a translation component coupled to an opposing side of the body portion and configured to convert lateral motion of the sliding switch sub-assembly between the first and second positions into vertical motion that activates the electrical actuator to establish an electrical connection to enable the at least one microphone when the sliding switch sub-assembly is in the first position and to break the electrical connection to disable the at least one microphone when the sliding switch sub-assembly is in the second position, wherein the slider cage is positioned between the electronics board and the sliding switch sub-assembly.

17. The playback device of claim 16, wherein the translation component is a spring; and wherein the spring comprises an arm including a contact portion that engages the electrical actuator and an inflection region configured to shape the arm such that the contact portion is positioned vertically above a region of the arm.

18. The playback device of claim 16, wherein the electrical actuator is configured to establish the electrical connection to enable a cloud-based voice assistant feature associated with the network device when the sliding switch sub-assembly is in the first position and to break the electrical connection to disable the cloud-based voice assistant feature when the sliding switch sub-assembly is in the second position.

19. The playback device of claim 18, wherein the electrical actuator is further configured to establish another electrical connection to enable a local voice assistant feature associated with the network device when the sliding switch sub-assembly is in the second position.

20. The playback device of claim 16, wherein the sliding switch sub-assembly is further configured to move along the path to and from a third position;
wherein, when the sliding switch sub-assembly is in the first position, the electrical actuator is configured to establish the electrical connection to enable the at least one microphone and to enable a voice assistant feature associated with the playback device; and
wherein, when the sliding switch sub-assembly is in the third position, the electrical actuator is configured to disable the voice assistant feature.

* * * * *